(12) United States Patent
Nozawa

(10) Patent No.: US 8,497,990 B2
(45) Date of Patent: Jul. 30, 2013

(54) OPTICAL FILTER, OPTICAL FILTER MODULE, SPECTROMETRIC MEASUREMENT APPARATUS, AND OPTICAL APPARATUS

(75) Inventor: Takeshi Nozawa, Suwa (JP)

(73) Assignee: Seiko Epson Corporation (JP)

( * ) Notice: Subject to any disclaimer, the term of this patent is extended or adjusted under 35 U.S.C. 154(b) by 227 days.

(21) Appl. No.: 13/114,400

(22) Filed: May 24, 2011

(65) Prior Publication Data

US 2012/0013905 A1 Jan. 19, 2012

(30) Foreign Application Priority Data

Jul. 13, 2010 (JP) ................................ 2010-158876

(51) Int. Cl.
*G01N 21/25* (2006.01)
(52) U.S. Cl.
USPC ......................................................... 356/419
(58) Field of Classification Search
USPC ................................................ 356/402–425
See application file for complete search history.

(56) References Cited

U.S. PATENT DOCUMENTS

| 4,439,038 A | * | 3/1984 | Mactaggart | 356/408 |
| 6,985,216 B2 | * | 1/2006 | Treado et al. | 356/73 |
| 2005/0270548 A1 | * | 12/2005 | Komiya et al. | 358/1.9 |

FOREIGN PATENT DOCUMENTS

JP 11-142752 5/1999

* cited by examiner

*Primary Examiner* — Tara S Pajoohi Gomez
(74) *Attorney, Agent, or Firm* — Harness, Dickey & Pierce, P.L.C.

(57) ABSTRACT

An optical filter includes a first variable wavelength bandpass filter that extracts light of a first wavelength band and has first and second spectral bands and a second variable wavelength bandpass filter that extracts light of a second wavelength band adjacent to the first wavelength band and has third and fourth spectral bands. Part of the period during which the light of the first spectral band is extracted overlaps with the period during which the light of the third spectral band is extracted, and part of the period during which the light of the second spectral band is extracted overlaps with the period during which the light of the fourth spectral band is extracted.

13 Claims, 12 Drawing Sheets

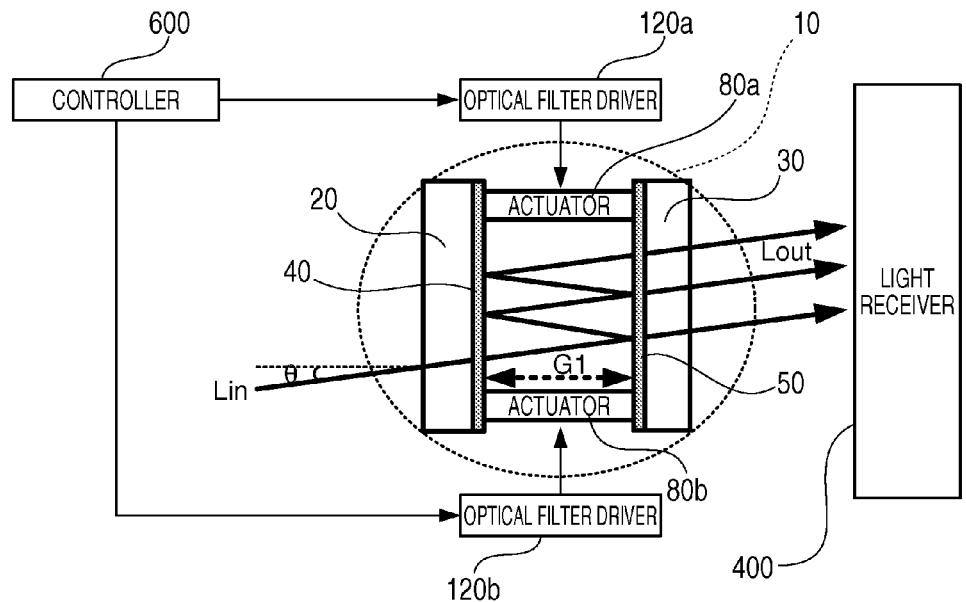
FIG. 2A
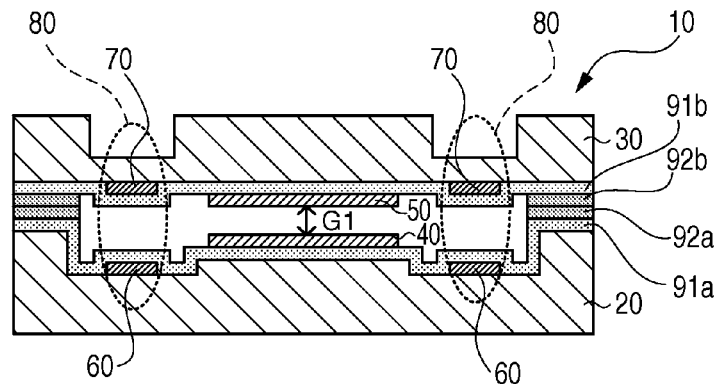
FIG. 2B
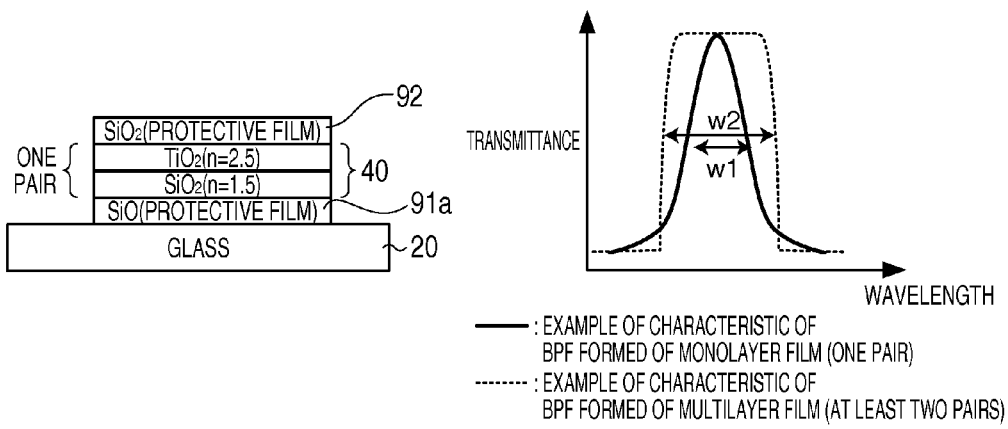
FIG. 2C
FIG. 2D

| EXAMPLE OF DRIVE VOLTAGES USED WHEN DIFFERENT VOLTAGES ARE APPLIED TO DIFFERENT SPECTRAL BANDS | | |
|---|---|---|
| | WAVELENGTH AT WHICH MEASUREMENT IS PERFORMED [nm] | DRIVE VOLTAGE [V] |
| p1 (SHORT) | 400 | 45 |
| p2 | 420 | 44 |
| p3 | 440 | 43 |
| p4 | 460 | 42 |
| p5 | 480 | 41 (VA) |
| p6 | 500 | 40 |
| p7 | 520 | 39 |
| p8 (INTERMEDIATE) | 540 | 38 |
| p9 | 560 | 37 |
| p10 | 580 | 36 (VB) |
| p11 | 600 | 35 |
| p12 | 620 | 34 |
| p13 (LONG) | 640 | 31 |
| p14 | 660 | 29 |
| p15 | 680 | 27 |
| p16 | 700 | 24 (VC) |

FIG. 12A

| EXAMPLE OF DRIVE VOLTAGES USED WHEN SAME VOLTAGE IS APPLIED TO DIFFERENT SPECTRAL BANDS | | |
|---|---|---|
| | WAVELENGTH AT WHICH MEASUREMENT IS PERFORMED [nm] | DRIVE VOLTAGE [V] |
| p1 (SHORT) | 400 | 45 |
| p2 | 420 | 41 |
| p3 | 440 | 37 |
| p4 | 460 | 33 |
| p5 | 480 | 29 |
| p6 | 500 | 45 |
| p7 | 520 | 41 |
| p8 (INTERMEDIATE) | 540 | 37 |
| p9 | 560 | 33 |
| p10 | 580 | 29 |
| p11 | 600 | 45 |
| p12 | 620 | 41 |
| p13 (LONG) | 640 | 37 |
| p14 | 660 | 33 |
| p15 | 680 | 29 |
| p16 | 700 | 24 |

FIG. 12B

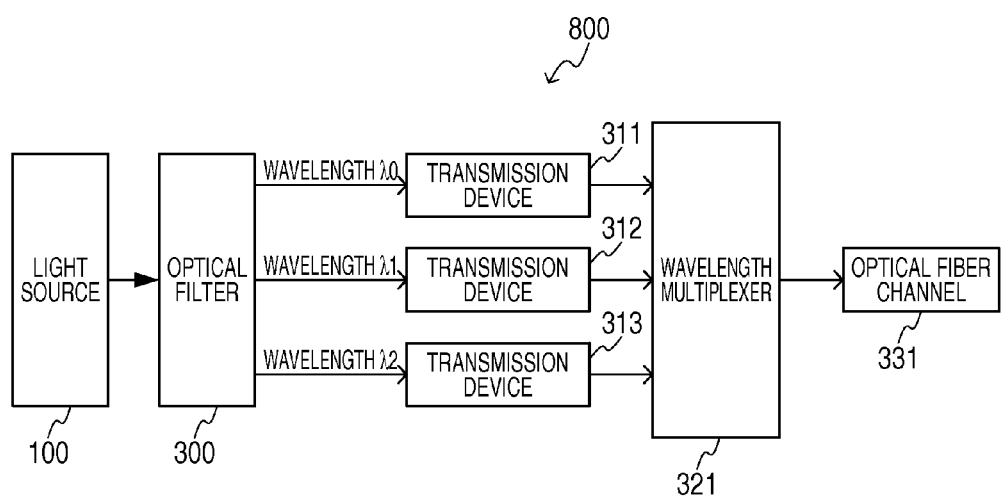

FIG. 13

OPTICAL FILTER, OPTICAL FILTER MODULE, SPECTROMETRIC MEASUREMENT APPARATUS, AND OPTICAL APPARATUS

BACKGROUND

1. Technical Field

The present invention relates to an optical filter, an optical filter module, a spectrometric measurement apparatus, an optical apparatus, and other apparatus.

2. Related Art

An interference filter has been used in a spectrometric measurement apparatus and other optical apparatus. A known aspect of an interference filter selects the wavelength of light that passes therethrough (Fabry-Perot etalon interference filter) (see JP-A-11-142752, for example). The transmissive variable wavelength interference filter described in JP-A-11-142752, which can select the wavelength of light passing therethrough, includes a pair of substrates held in parallel to each other and a pair of multilayer films (optical films) so formed on the pair of substrates that the multilayer films (optical films) face each other and have a fixed-distance gap therebetween. The interference filter selects the wavelength of light passing therethrough by using an external force to change the size of the gap (interference gap) between the pair of multilayer films (optical films).

When a single variable wavelength filter (variable gap etalon filter, for example) is used to cover a desired wavelength band and perform n-point spectrometric measurement (n is an integer greater than or equal to two), the size of the gap between the multilayer films (optical films) in the variable wavelength filter needs to be changed. Specifically, it is necessary to repeat the following actions multiple times corresponding to the number of measurement points: changing the size of the gap to provide a spectral band corresponding to each of the measurement points and then performing spectrometric measurement in the spectral band. A wide bandwidth of the desired wavelength band therefore increases the measurement period required to acquire all necessary measured data. That is, it disadvantageously takes a long time for the variable wavelength filter to scan the entire desired wavelength band.

SUMMARY

An advantage of some aspects of the invention is, for example, to provide a variable wavelength filter that can shorten the period required to scan an entire desired wavelength band.

1. According to an aspect of the invention, there is provided an optical filter including: a first variable wavelength bandpass filter, a second variable wavelength bandpass filter, a driver that drives each of the first and second variable wavelength bandpass filters, and a controller that variably controls a spectral band of each of the first and second variable wavelength bandpass filters. The first variable wavelength bandpass filter can extract light of a first wavelength band located in a desired wavelength band and has at least the following spectral bands: a first spectral band having a central wavelength equal to a first wavelength in the first wavelength band and a second spectral band having a central wavelength equal to a second wavelength in the first wavelength band. The second variable wavelength bandpass filter can extract light of a second wavelength band located in the desired wavelength band and adjacent to the first wavelength band and has at least the following spectral bands: a third spectral band having a central wavelength equal to a third wavelength in the second wavelength band and a fourth spectral band having a central wavelength equal to a fourth wavelength in the second wavelength band. The driver drives the first and second variable wavelength bandpass filters concurrently. The period during which the first variable wavelength bandpass filter extracts the light of the first spectral band overlaps with at least part of the period during which the second variable wavelength bandpass filter extracts the light of the third spectral band. The period during which the first variable wavelength bandpass filter extracts the light of the second spectral band overlaps with at least part of the period during which the second variable wavelength bandpass filter extracts the light of the fourth spectral band.

In the present aspect, a desired wavelength band is not covered with a single variable wavelength filter but is covered with a plurality of (that is, at least two) variable wavelength bandpass filters, which are driven concurrently.

A variable wavelength bandpass filter is a single optical filter that can effectively provide a plurality of spectral bands, has a simple configuration but can cover a wide wavelength range, and has excellent usability. A plurality of variable wavelength bandpass filters are used and a spectral band is allocated to each of the filters, whereby a burden on each of the filters is reduced, and efficient wavelength scan is achieved by driving the filters concurrently. That is, since the plurality of variable wavelength bandpass filters (including at least a first variable wavelength bandpass filter and a second variable wavelength bandpass filter) are driven concurrently, at least parts of the periods during which the filters extract light overlap with each other along the temporal axis, whereby the period required to scan the entire desired wavelength band discretely on a predetermined bandwidth basis can be shortened. For example, when n variable wavelength bandpass filters are driven simultaneously, the period required to scan the entire desired wavelength band is reduced, for example, to 1/n of the period achievable in related art. As a result, for example, an optical filter capable of efficiently covering a wide wavelength range is provided.

Further, using the plurality of variable wavelength bandpass filters to extract light of wavelength bands allocated thereto can reduce the moving range of movable portions of the variable wavelength bandpass filters and hence suppress increase in the voltages for driving actuators. As a result, a drive circuit (driver) is readily configured, and the power consumption can be reduced.

Moreover, for example, optical films (each of which, for example, has a structure in which constituent films having different refractive indices are stacked and has both light reflection and transmission properties) used in the variable wavelength bandpass filters can be simplified, which contributes to simplification of the configuration of the optical filter.

2. According to another aspect of the invention, in the optical filter according to the above aspect of the invention, each of the first and second variable wavelength bandpass filters is formed of a variable gap etalon filter. The first variable wavelength bandpass filter has a first gap, and the second variable wavelength bandpass filter has a second gap. The first and second gaps have the same initial gap size when the first and second variable wavelength bandpass filters start being driven. The driver drives the first variable wavelength bandpass filter with a first drive voltage and drives the second variable wavelength bandpass filter with a second drive voltage different from the first drive voltage.

In the present aspect, the plurality of variable wavelength bandpass filters have the same initial gap size, and the gaps in the filters are individually controlled by applying drive voltages having different levels. In this way, the filters have different gap sizes and hence provide spectral bands having desired wavelength ranges. The initial gap size in a variable wavelength bandpass filter used herein means the size of the gap when no drive voltage is applied. In the present aspect, different voltages can be applied to the filters. In this case, even if the characteristics of the filters vary, the drive voltages can be so (finely) adjusted that the variances are compensated. Since optimum drive voltages are applied to the filters, the spectral bands of the filters are provided more precisely.

Further, since different drive voltages are applied to the filters, overshooting (and undershooting) phenomena that occur when the voltages are applied have different cycles. If such fluctuations in the drive voltages are superimposed, the resultant large noise may greatly change a reference potential (ground GND or power source potential VDD) in the driver. In the present aspect, however, in which the fluctuations in the drive voltages have different cycles, the noise is distributed along the temporal axis and hence large noise is unlikely produced. Further, since the drive voltage can be adjusted for each of the filters, for example, fine adjustment of the drive voltage is readily made by changing the drive voltage by a small amount at a time when the voltage level is switched. In this case, the overshooting of the drive voltage that occurs when the voltage is switched can be suppressed.

3. According to another aspect of the invention, in the optical filter according to the above aspect of the invention, each of the first and second variable wavelength bandpass filters is formed of a variable gap etalon filter. The first variable wavelength bandpass filter has a first gap and the second variable wavelength bandpass filter has a second gap. The first and second gaps have different initial gap sizes when the first and second variable wavelength bandpass filters start being driven. The driver drives the first variable wavelength filter with a first drive voltage and drives the second variable wavelength filter with a second drive voltage equal to the first drive voltage.

In the present aspect, the plurality of variable wavelength bandpass filters have different initial gap sizes. That is, as the initial gap size in each of the filters, the gap size corresponding to the wavelength at one end of the band extracted by the filter is selected. In this state, the gaps in the filters are changed to switch the wavelength ranges of the spectral bands of the filters by applying drive voltages having the same level.

According to the present aspect, the same drive voltage can be applied to the filters, which allows reduction in the number of drive voltage values set in in a voltage setting memory provided in the controller. When n variable wavelength bandpass filters are used, the number of voltages to be set is reduced to 1/n. As a result, the voltage setting memory can be a small capacity memory, which reduces the footprint of the memory, which is advantageous in size reduction. Further, the voltage setting memory can, for example, be an inexpensive ROM. The noise that occurs when the drive voltages are switched will not be so problematic as long as the amounts of change in the drive voltages are not very large whenever they are switched.

4. According to another aspect of the invention, in the optical filter according to the above aspect of the invention, the first variable wavelength bandpass filter includes a first substrate, a second substrate that faces the first substrate, a first optical film provided on the first substrate, a second optical film provided on the second substrate and facing the first optical film, a first electrode provided on the first substrate and formed around the first optical film in a plan view viewed in a thickness direction of the first substrate, and a second electrode provided on the second substrate and formed around the second optical film in a plan view viewed in a thickness direction of the second substrate. The first variable wavelength bandpass filter can extract light of the first or second spectral band when the first gap between the first optical film and the second optical film is changed by an electrostatic force induced between the first electrode and the second electrode. The second variable wavelength bandpass filter includes a third substrate, a fourth substrate that faces the third substrate, a third optical film provided on the third substrate, a fourth optical film provided on the fourth substrate and facing the third optical film, a third electrode provided on the third substrate and formed around the third optical film in a plan view viewed in a thickness direction of the third substrate, and a fourth electrode provided on the fourth substrate and formed around the fourth optical film in a plan view viewed in a thickness direction of the fourth substrate. The second variable wavelength bandpass filter can extract light of the third or fourth spectral band when the second gap between the third optical film and the fourth optical film is changed by an electrostatic force induced between the third electrode and the fourth electrode.

In the present aspect, an electrostatically driven variable gap etalon filter (hereinafter sometimes simply referred to as a variable gap etalon or a filter) is used as each of the first and second variable wavelength bandpass filters. The first variable wavelength bandpass filter includes a first substrate (fixed substrate, for example) and a second substrate (movable substrate, for example) that is so disposed that it faces the first substrate. The first substrate (fixed substrate, for example) has a first optical film formed thereon and a first electrode, which is a component of an electrostatic actuator, formed around the first optical film. The second substrate (movable substrate, for example) has a second optical film formed thereon and a second electrode, which is a component of the electrostatic actuator, formed around the second optical film. The second optical film is so disposed that is faces, for example, the first optical film, and the second electrode is so formed around the second optical film that the second electrode faces, for example, the first electrode. The first and second optical films have a function as a reflective film that is a component of an interferometer. When a predetermined potential difference is produced between the first electrode and the second electrode, an electrostatic force (electrostatic attraction, for example) or any other similar force is induced between the electrodes. The second substrate, which is, for example, a movable substrate, has flexibility and flexes due to the electrostatic force. As a result, the size of the gap (interference gap) between the first optical film and the second optical film is changed (narrowed, for example), and the optical transmission band (that is, spectral band) of the variable gap etalon filter is changed accordingly.

The configuration and the action of the second variable wavelength bandpass filter are the same as those of the first variable wavelength bandpass filter. That is, the second variable wavelength bandpass filter includes a third substrate (fixed substrate, for example) and a fourth substrate (movable substrate, for example) that is so disposed that it faces the third substrate. The third substrate (fixed substrate, for example) has a third optical film formed thereon and a third electrode, which is a component of an electrostatic actuator, formed around the third optical film. The fourth substrate (movable substrate, for example) has a fourth optical film formed thereon and a fourth electrode, which is a component of the electrostatic actuator, formed around the fourth optical film. The fourth optical film is so disposed that is faces the third optical film, and the fourth electrode is so formed around the fourth optical film that the fourth electrode faces, for example, the third electrode. The third and fourth optical films have a function as a reflective film that is a component of an interferometer.

A variable gap etalon filter is a variable wavelength filter using the principle of a Fabry-Perot interferometer and suitable to achieve a simple configuration, compactness, and inexpensiveness. In the present aspect, a plurality of variable gap etalon filters are used, and the filters extract light of respective different wavelength bands. Using a plurality of variable wavelength filters reduces the moving range of the actuator in each of the filters, resulting in reduction in the drive voltage (reduction in power consumption) and decrease in the amount of change in the drive voltage per drive operation, whereby the accuracy in the drive voltage is advantageously improved as compared with a case where the drive voltage is greatly changed. Further, the optical films can be readily designed. Design and process burdens can thus be reduced. As a result, an optical filter characterized by a simplified configuration, being compact and lightweight, an ability to cover a wide wavelength range efficiently, and excellent usability can be provided.

5. According to another aspect of the invention, in the optical filter according to the above aspect of the invention, the first, second, third, and fourth optical films are made of the same material.

In the present aspect, the optical films provided in the plurality of variable wavelength bandpass filters can be made of the same material. That is, using a plurality of variable gap etalon filters reduces the burden on each of the filters and allows the optical films to be made of the same material, which contributes to reduction in the burden of manufacturing the optical filter (for example, simplification of manufacturing processes).

6. According to another aspect of the invention, there is provided an optical filter module including any of the optical filters described above and a light receiver that receives light having passed through the optical filter.

The optical filter module can, for example, be used as a receiver (including light receiving optical systems and light receiving devices) of an optical communication apparatus or a light receiver (including light receiving optical systems and light receiving devices) of a spectrometric measurement apparatus. According to the present aspect, an optical filter module characterized by a wide wavelength range of transmitted light, compactness, an ability to shorten the period required to scan an entire desired band, and excellent usability is provided.

7. According to another aspect of the invention, there is provided a spectrometric measurement apparatus including: any of the optical filters described above, a light receiver that receives light having passed through the optical filter, and a signal processor that performs predetermined signal processing based on received light signals provided from the light receiving devices. The controller drives the first and second variable wavelength bandpass filters. The signal processing of a first received light signal provided from the light receiver that receives the light having passed through the first variable wavelength bandpass filter and the signal processing of a second received light signal provided from the light receiver that receives the light having passed through the second variable wavelength bandpass filter are performed concurrently.

In the present aspect, the variable wavelength bandpass filters are concurrently driven, and the light receiver receives the light having passed through the filters and concurrently processes the resultant received light signals. Since this configuration allows not only concurrent light extraction but also concurrent received light signal processing, the spectrometric measurement apparatus can perform significantly efficient measurement. As a result, a spectrometric measurement apparatus characterized by a simplified configuration, being compact and lightweight, an ability to cover a wide wavelength range, an ability to shorten the measurement period significantly, excellent usability, and other advantages can be provided.

The signal processor performs predetermined signal processing based on the signals (received light signals) provided from the light receiver to measure, for example, a spectrophotometric distribution of associated with a sample. Measuring a spectrophotometric distribution allows measurement of the color of the sample, analysis of the components of the sample, and other operation.

8. According to another aspect of the invention, there is provided an optical apparatus including any of the optical filters described above. According to the present aspect, for example, an optical apparatus (a variety of sensors and optical communication-related apparatus, for example) characterized by a simplified configuration, being compact and lightweight, an ability to cover a wide wavelength range, and excellent usability is provided.

BRIEF DESCRIPTION OF THE DRAWINGS

The invention will now be described with reference to the accompanying drawings, wherein like numbers refer to like elements.

FIGS. 2A to 2D show the principle of a variable gap etalon filter and an example of the structure thereof.

FIGS. 12A and 12B show examples of specific drive voltage values versus wavelengths at which the measurement is performed.

FIG. 13 is a block diagram showing a schematic configuration of a transmitter in a wavelength multiplexing communication system, which is an example of an optical apparatus according to an embodiment of the invention.

DESCRIPTION OF EXEMPLARY EMBODIMENTS

Preferred embodiments of the invention will be described below in detail. The embodiments described below are not intended to inappropriately limit the contents of the invention set forth in the claims. Further, all components described in the embodiments are not necessarily essential as solutions provided in the invention.

First Embodiment

In a first embodiment, an example of the configuration and action of an optical filter (including a plurality of variable wavelength bandpass filters) will be described with reference to an optical apparatus (spectrometric measurement apparatus in the following description) including the optical filter. Examples of the spectrometric measurement apparatus may include a colorimeter, a spectrometric analysis apparatus, and an optical spectrum analyzer.

Figure 1A:
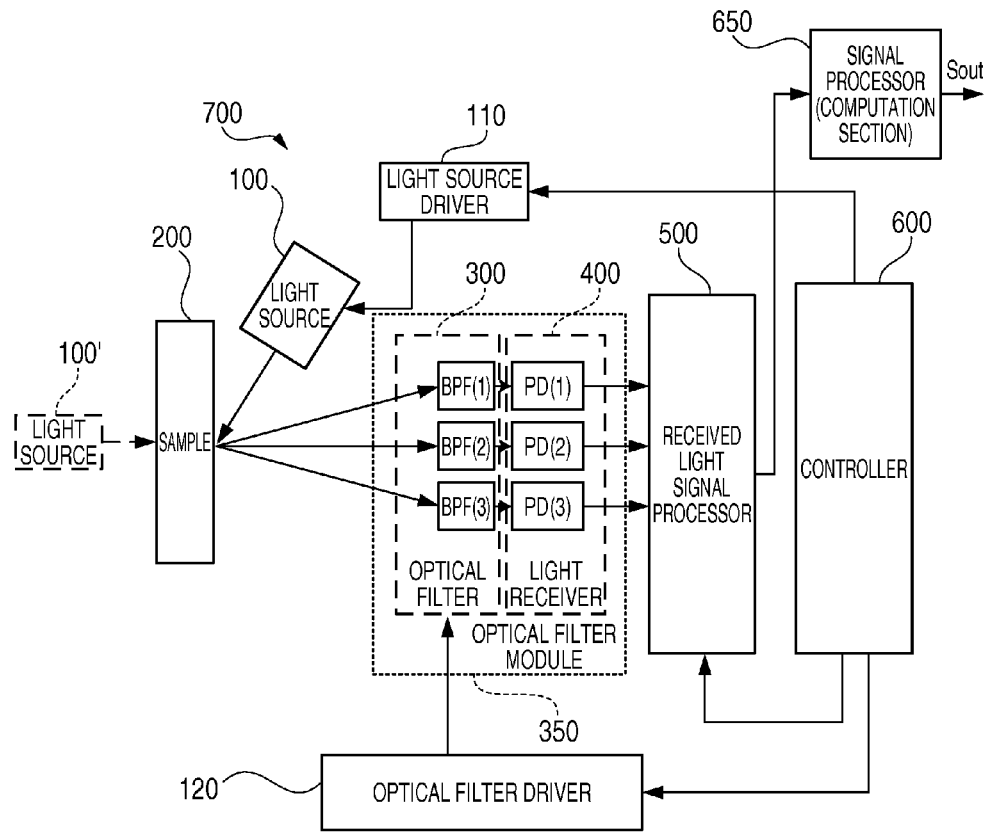
FIG. 1A shows an example of the overall configuration of a spectrometric measurement apparatus.
Figure 1B:
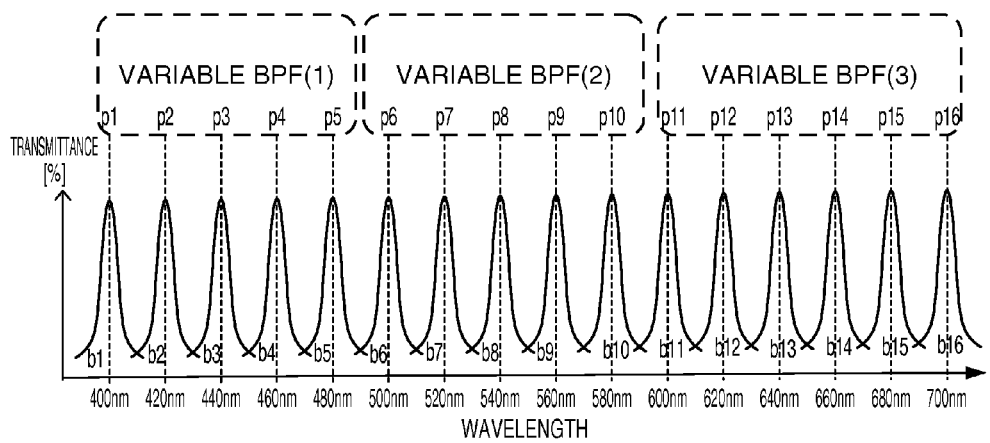
FIG. 1B shows an example of the configuration of an optical filter.

Example of Overall Configuration of Spectrometric Measurement Apparatus and Example of Configuration of Optical Filter FIG. 1A shows an example of the overall configuration of a spectrometric measurement apparatus, and FIG. 1B shows an example of the configuration of an optical filter. For example, a light source 100 is used when the color of a sample 200 is measured, in which case, the light reflected off the sample 200 is incident on the optical filter. A light source 100' is used when the sample 200 is analyzed spectrometrically, in which case, the light having passed through the sample 200 is incident on the optical filter. The sample 200 to be spectrometrically analyzed may be a gas in some cases.

As shown in FIG. 1A, the spectrometric measurement apparatus 700 includes the light source 100 (or 100'), a light source driver 110, an optical filter (spectrometer) 300 including a plurality of variable wavelength bandpass filters (BPF(1) to BPF(3)), a light receiver 400 including light receiving devices PD(1) to PD(3), such as photodiodes, a received light signal processor 500 that converts received light signals (current signals) provided from the light receiver 400 into voltage signals and further converts the voltage values thereof into digital data (optical spectral data), a controller 600 (formed, for example, of a microcomputer or a gate array) that oversees the action of each component, a signal processor (computation section) 650 that performs predetermined signal processing (computation) based on the optical spectral data to determine a spectrophotometric distribution and other characteristics, and an optical filter driver 120 (simply referred to as a driver in some cases) that drives the variable wavelength bandpass filters BPF(1) to BPF(3).

The light source 100 (100') may be formed, for example, of an incandescent lamp, a fluorescent lamp, a discharge lamp, an LED, or any other solid-state light-emitting device (solid-state light-emitting device light source). The variable wavelength bandpass filters BPF(1) to BPF(3) can have a plurality of spectral bands having different wavelength ranges set therein. The wavelength ranges of the spectral bands of the filters BPF(1) to BPF(3) are determined as appropriate in accordance with the levels of drive signals (drive voltages, for example) outputted from the optical filter driver 120.

The signal processor 650 performs a variety of computations based on the received light signals (optical spectral data) provided from the light receiver 400, for example, to determine a spectrophotometric distribution associated with the sample 200. The signal processor 650 outputs information Sout on the determined spectrophotometric distribution. Measuring a spectrophotometric distribution allows measurement of the color of the sample 200, analysis of the components of the sample 200, and other operation.

The optical filter 300 and the light receiver 400 form an optical filter module 350. The optical filter module 350 can be used not only in a spectrometric measurement apparatus but also, for example, as a receiver (including light receiving optical systems and light receiving devices) in an optical communication apparatus. The optical filter module 350 in the present embodiment has advantages of a wide transmitted light wavelength range and a short optical spectral data acquisition period.

As shown in FIG. 1B, the optical filter 300 in the example shown in FIG. 1A is a variable wavelength filter that effectively covers a wide wavelength band (that is, desired band) ranging from 400 to 700 nm and allows a plurality of spectral bands to be set. That is, the optical filter 300 includes a first variable wavelength bandpass filter (BPF(1)), a second variable wavelength bandpass filter (BPF(2)), and a third variable wavelength bandpass filter (BPF(3)).

The first variable wavelength bandpass filter (BPF(1)) extracts light of a wavelength band ranging from 400 to 480 nm (first wavelength band) and has five spectral bands (transmission wavelength bands) b1 to b5, each of which has a bandwidth of 20 nm, set in the wavelength band. The central wavelengths of the bands b1 to b5 are 400, 420, 440, 460, and 480 nm, respectively. The second variable wavelength bandpass filter (BPF(2)) extracts light of a wavelength band ranging from 500 to 580 nm (second wavelength band) and has five spectral bands (transmission wavelength bands) b6 to b10, each of which has a bandwidth of 20 nm, set in the wavelength band. The central wavelengths of the bands b6 to b10 are 500, 520, 540, 560, and 580 nm, respectively. The third variable wavelength bandpass filter (BPF(3)) extracts light of a wavelength band ranging from 600 to 700 nm (third wavelength band) and has six spectral bands (transmission wavelength bands) b11 to b16, each of which has a bandwidth of 20 nm, set in the wavelength band. The central wavelengths of the bands b11 to b16 are 600, 620, 640, 660, 680, and 700 nm, respectively. In FIG. 1B, p1 to p16 represent measurement points set when the optical filter 300 is used in the spectrometric measurement apparatus. That is, 16 measurement points are set.

The wavelength bands extracted by the variable wavelength bandpass filters are in principle preferably those obtained by equally dividing the desired band. In the example shown in FIG. 1B, however, BPF(1) and BPF(2), which respectively extract light of a short wavelength band and light of an intermediate wavelength band, have five measurement points (p1 to p5 and p6 to p10) set therein, whereas BPF(3), which extracts light of a long wavelength band, has six measurement points (p11 to p16) set therein in order to provide an even number of measurement points. The reason why the long wavelength band has a greater number of measurement points is that the optical films are readily designed this way. For example, assume a case where each of the variable wavelength filters is formed of a variable gap etalon and the optical films used in the filters are made of the same material. In this case, a longer wavelength spectral band more readily allows a wider bandwidth to be provided. That is, a greater number of measurement points are more readily provided in a longer wavelength band. When it is necessary to differentiate the filters in a design process in terms of the number of measurement points, it is therefore preferable to increase the number of measurement points set in a filter that extracts light of a longer wavelength region.

The optical filter 300 in the present embodiment shown in FIGS. 1A and 1B is not formed of a single variable wavelength filter that covers the desired wavelength band (wavelength band to be covered) but is formed of a plurality of (that is, at least two) variable wavelength bandpass filters (BPF(1) to BPF(3)) that, as a whole, cover the desired wavelength band, and the variable wavelength bandpass filters (BPF(1) to BPF(3)) are driven concurrently.

That is, since the plurality of variable wavelength bandpass filters (including at least the first variable wavelength bandpass filter BPF(1) and the second variable wavelength bandpass filter BPF(2)) are driven concurrently, at least parts of the periods during which the filters extract light overlap with each other along the temporal axis, whereby the period required to scan the entire desired wavelength band discretely on a predetermined bandwidth basis can be shortened. For example, when n variable wavelength bandpass filters are driven simultaneously, the period required to scan the entire desired wavelength band is reduced, for example, to 1/n of the period achievable in related art. As a result, for example, an optical filter capable of efficiently covering a wide wavelength range is provided.

Further, using the plurality of variable wavelength bandpass filters (BPF(1) to BPF(3)) to extract light of wavelength bands allocated thereto can reduce the moving range of movable portions of the variable wavelength bandpass filters (BPF(1) to BPF(3)) and hence suppress increase in the voltages for driving actuators. As a result, the optical filter driver 120 is readily configured, and the power consumption can be reduced.

Moreover, when each of the variable wavelength bandpass filters (BPF(1) to BPF(3)) is formed, for example, of a variable gap etalon filter, the wavelength band to be extracted by each of the filters can be narrowed, whereby the optical films (each of which, for example, has a structure in which constituent films having different refractive indices are stacked and has both light reflection and transmission properties) used in the filters can be made of the same material. As a result, a burden related to manufacturing the optical filter 300 can be reduced.

Configuration and Other Characteristics of Variable Gap Etalon Filter

Each of the variable wavelength bandpass filters (BPF(1) to BPF(3)) shown in FIGS. 1A and 1B can be formed, for example, of a variable gap etalon filter (sometimes simply referred to as a variable gap etalon or a filer), as described above. Changing the gap size of the variable gap etalon allows a single optical filter to effectively provide a plurality of (that is, at least two) spectral bands.

FIGS. 2A to 2D show the principle of the variable gap etalon filter and an example of the structure thereof. As shown in FIG. 2A, a variable gap etalon filter 10, which forms the optical filter 300, includes a first substrate (fixed substrate, for example) 20, a second substrate (movable substrate, for example) 30, which are so disposed that they face each other, a first optical film 40 provided on a principal surface (front surface) of the first substrate 20, a second optical film 50 provided on a principal surface (front surface) of the second substrate 30, and actuators (electrostatic actuators or piezoelectric devices, for example) 80a and 80b sandwiched between the substrates and adjusting the gap (distance) between the substrates. The gas size is set at G1.

At least one of the first substrate 20 and the second substrate 30 may be a movable substrate, or both the substrates may be movable substrates. The actuators 80a and 80b are driven by optical filter drivers 120a and 120b, respectively. The operation of each of the optical filter drivers 120a and 120b is controlled by the controller (control circuit) 600.

Light Lin externally incident at a predetermined angle θ is scattered very little but passes through the first optical film 40. The light is repeatedly reflected off and between the first optical film 40 provided on the first substrate 20 and the second optical film 50 provided on the second substrate 30. As a result, optical interference occurs and only the light having a wavelength that satisfies a specific condition undergoes constructive interference. Part of the light of that wavelength having undergone the constructive interference passes through the second optical film 50 on the second substrate 30 and reaches the light receiver 400 (light receiving devices). Light of what wavelength undergoes the constructive interference depends on the size of the gap between the first substrate 20 and the second substrate 30, specifically, the size of the gap between the first optical film 40 and the second optical film 50. The wavelength band of the transmitted light can therefore be changed by variably controlling the gap.

FIG. 2B shows an example of a cross-sectional structure of the variable gap etalon filter. The variable gap etalon 10 includes the first substrate 20, the second substrate 30, which face each other in parallel to each other, the first optical film 40, the second optical film 50, a first electrode 60 formed around the first optical film 40 on the first substrate 20, and a second electrode 70 formed around the second optical film 50 on the second substrate 30, as shown in FIG. 2B. The first electrode 60 and the second electrode 70 are so disposed that they face each other, and the pair of electrodes form an electrostatic actuator 80. Driving the variable gap etalon using the electrostatic actuator 80 will be described later with reference to a specific example. The gap size (the distance between the optical films) is set at G1. Reference characters 91a and 91b denote oxide films ($SiO_2$ films), and reference characters 92a and 92b denote bonding films (plasma polymerization films, for example).

FIG. 2C shows an example of the structure of the first optical film 40 formed on the first substrate 20 (glass substrate, for example). The first optical film 40 is formed by stacking at least a pair of a silicon dioxide film ($SiO_2$ film (refractive index n=1.5)) and a titanium dioxide film ($TiO_2$ film (refractive index n=2.5)). The first optical film 40 is not necessarily the stacked film described above, but may, for example, be a film made of an Ag alloy.

The first optical film 40 functions not only as a reflective film but also as a light transmissive film. An oxide film ($SiO_2$ film) 92 is formed as a protective film on the titanium dioxide film ($TiO_2$ film). Adjusting the thickness of the oxide film 92 as a protective film allows fine adjustment of the gap. The second optical film 50 can be configured in the same manner as the first optical film 40.

FIG. 2D shows change in the optical transmission characteristic of a bandpass filter when the number of pairs of stacked optical films is changed (Note that FIG. 2D is presented only by way of example). The characteristic of a bandpass filter formed of a monolayer film (a pair of films) is represented, for example, by the solid line (w1: full width at half maximum transmittance), and the characteristic of a bandpass filter formed of a multilayer film (at least two pairs of films) is represented, for example, by the dotted line (w2: full width at half maximum transmittance (w2>w1)). As seen from FIG. 2D, increasing the number of pairs that form the optical film can increase the full width at half maximum transmittance of the bandpass filter (that is, the bandwidth of the optical transmission band).

For example, assume that BPF(1) is a variable gap etalon that extracts light of a short-wavelength spectral band; BPF(2) is a variable gap etalon that extracts light of an intermediate-wavelength spectral band; BPF(3) is a variable gap etalon that extracts light of a long-wavelength spectral band; and each of the etalons has an initial gap size of 1 μm, BPF(1) to BPF(3) can be configured as follows: The number of stacked film pairs of each of the first optical film 40 and the second optical film 50 in BPF(1) can be one; the number of stacked film pairs of the first optical film 40 can be one and the number of stacked film pairs of the second optical film 50 can be two in BPF(2); and the number of stacked film pairs of the first optical film 40 can be one and the number of stacked film pairs of the second optical film 50 can be two in BPF(3). As a method for driving the variable gap etalons, there are a first driving method (the filters have the same initial gap size) and a second driving method (the filters have different initial gap sizes), as will be described later. The number of pairs of the optical films described above can be used in both the methods. It is, however, noted that the example described above is presented by way of example and the present invention is not limited thereto.

Specific Example of Spectrometric Measurement Apparatus

Figure 3:
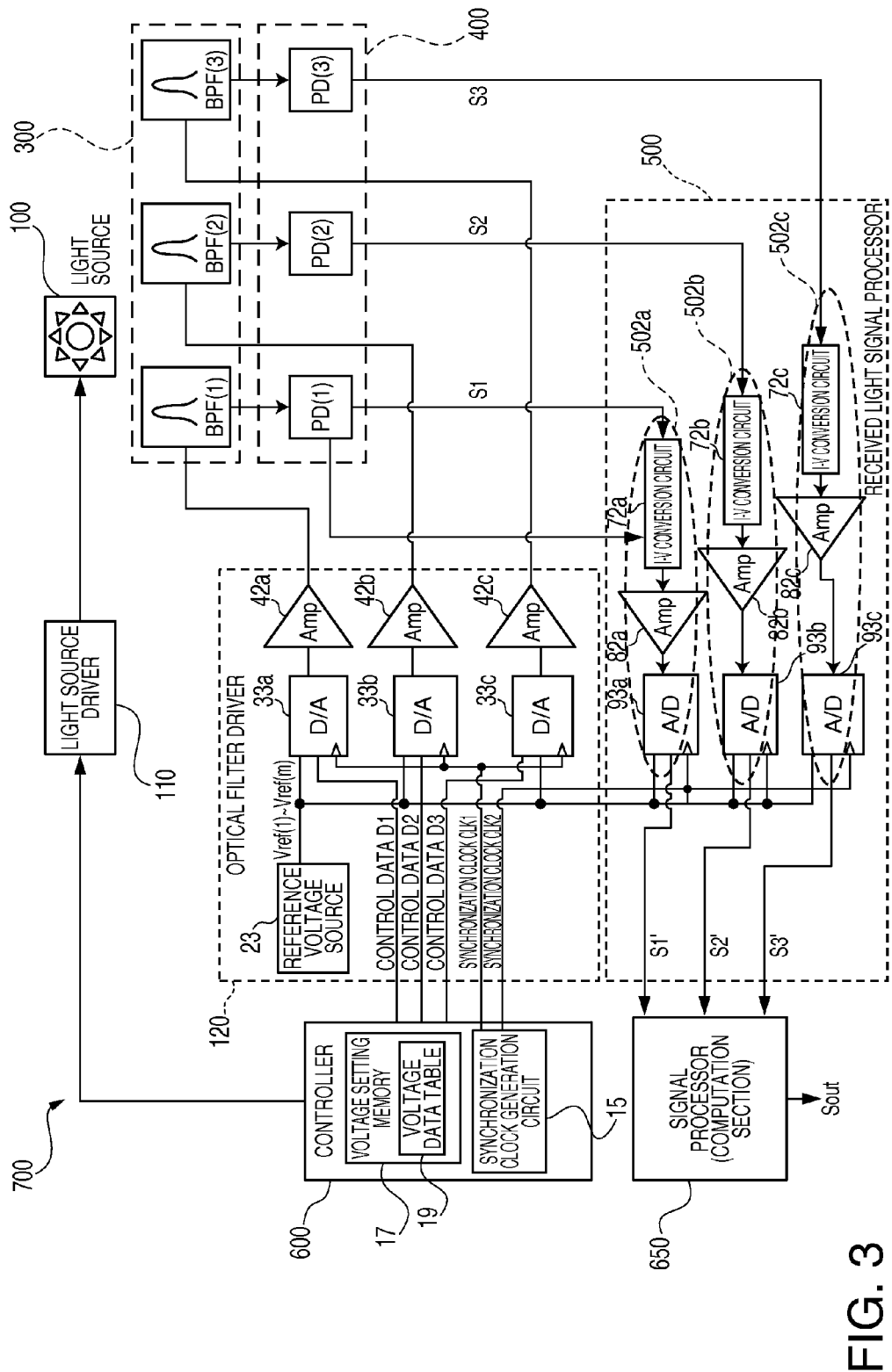
FIG. 3 shows a specific example of the configuration of the spectrometric measurement apparatus.

The configuration of the spectrometric measurement apparatus 700 will next be described more specifically. FIG. 3 shows a specific example of the configuration of the spectrometric measurement apparatus. In FIG. 3, the same portions as those in the previous figures have the same reference characters.

In the spectrometric measurement apparatus shown in FIG. 3, a plurality of variable gap etalon filters are concurrently driven, and the light receiver receives the light having passed through the filters and concurrently processes the resultant received light signals. Employing this configuration allows not only concurrent light extraction but also concurrent received light signal processing. The spectrometric measurement apparatus 700 can therefore perform significantly efficient measurement. As a result, a spectrometric measurement apparatus characterized by a simplified configuration, being compact and lightweight, an ability to cover a wide wavelength range, an ability to shorten the measurement period significantly, excellent usability, and other advantages can be provided.

The controller 600 includes a synchronization clock generation circuit 15 and a voltage setting memory 17. The voltage setting memory 17 stores a voltage data table 19. The level of the voltage for driving each of the variable gap etalon filters is determined based on voltage data in the voltage data table 19.

The optical filter driver 120 includes a reference voltage source 23, D/A converters 33*a* to 33*c*, and amplifiers 42*a* to 42*c*. The reference voltage source 23 outputs a plurality of drive voltages Vref(1) to Vref(m) having different voltage levels in parallel, where m is an integer greater than or equal to two. The plurality of drive voltages (Vref(1) to Vref(m)) and voltage data D1 are inputted, for example, to the D/A converter 33*a*. The D/A converter 33*a* selects a drive voltage corresponding to the voltage data D1 from the plurality of drive voltages (Vref(1) to Vref(m)) and outputs the selected drive voltage, which is amplified by the amplifier 42*a*. The amplified drive voltage is supplied to the first variable gap etalon filter BPF(1), which serves as the first variable wavelength filter incorporated in the optical filter 300. The drive voltage controls the gap of the first variable gap etalon filter BPF(1) to determine the wavelength band (that is, spectral band) of the transmitted light.

Similarly, the plurality of drive voltages (Vref(1) to Vref(m)) and voltage data D2 are inputted to the D/A converter 33*b*. The drive voltage outputted from the D/A converter 33*b* is amplified by the amplifier 42*b*, and the amplified drive voltage is supplied to the second variable gap etalon filter BPF(2). The drive voltage controls the gap of the second variable gap etalon filter BPF(2) to determine the wavelength band (spectral band) of the transmitted light.

Similarly, the plurality of drive voltages (Vref(1) to Vref(m)) and voltage data D3 are inputted to the D/A converter 33*c*. The drive voltage outputted from the D/A converter 33*c* is amplified by the amplifier 42*c*, and the amplified drive voltage is supplied to the third variable gap etalon filter BPF(3). The drive voltage controls the gap of the third variable gap etalon filter BPF(3) to determine the wavelength band (spectral band) of the transmitted light.

The D/A converters 33*a* to 33*c* operate, for example, concurrently in synchronization with a synchronization clock CLK1 outputted from the synchronization clock generation circuit 15 incorporated in the controller 600. When the filters operate simultaneously, the measurement period can be minimized. It is, however, noted that the filters are not necessarily driven in a completely simultaneous manner. For example, the filters may be driven with slight timing discrepancies.

When the D/A converters 33*a* to 33*c* operate concurrently based on the common clock (synchronization clock CLK1), at least parts of the periods during which BPF(1) to BPF(3) extract light of the respective spectral bands overlap with each other along the temporal axis, whereby the period required for the light extraction is shortened and hence the light extraction is efficiently performed. For example, when BPF(1), BPF(2), and BPF(3) respectively extract light of the first, second, and third spectral bands in a first measurement period, the period during which the light of the first spectral band is extracted overlaps with at least part of the period during which the light of the second or third spectral band is extracted along the temporal axis. Further, when BPF(1), BPF(2), and BPF(3) respectively extract light of fourth, fifth, and sixth spectral bands in the next measurement period, the period during which the light of the fourth spectral band is extracted overlaps with at least part of the period during which the light of the fifth or sixth spectral band is extracted along the temporal axis. As a result, the period required to scan the entire desired wavelength band discretely on a predetermined bandwidth basis can be shortened. In the example shown in FIG. 3, in which three variable gap etalons are used, driving them simultaneously allows the period required to scan the entire desired wavelength band to be shortened to ⅓ of the period achievable in related art. As a result, for example, an optical filter capable of efficiently covering a wide wavelength range is provided.

Further, using the plurality of variable wavelength bandpass filters to extract light of wavelength bands allocated thereto can reduce the moving range of movable portions of the variable wavelength bandpass filters and hence suppress increase in the voltages for driving the actuators. As a result, the optical filter driver 120 is readily configured, and power consumption can be reduced. Moreover, for example, the optical films (each of which, for example, has a structure in which constituent films having different refractive indices are stacked and has both light reflection and transmission properties) used in the variable gap etalons BPF(1) to BPF(3) can be made of the same material, which contributes to simplification of the configuration of the optical filter 300.

The first light receiving device PD(1) incorporated in the light receiver 400 receives the light having traveled via (passing through) BPF(1), produces a first received light signal (current signal) S1 in a photoelectric conversion process, and outputs the signal S1. Similarly, the second light receiving device PD(2) receives the light having traveled via BPF(2), produces a second received light signal (current signal) S2 in a photoelectric conversion process, and outputs the signal S2. The third light receiving device PD(3) receives the light having traveled via BPF(3), produces a third received light signal (current signal) S3 in a photoelectric conversion process, and outputs the signal S3.

The received light signal processor 500 includes three signal processing paths 502*a* to 502*c*. The first signal processing path 502*a* includes an I-V conversion circuit 72*a* that performs current/voltage conversion, an amplifier 82a, and an A/D converter 93a. Similarly, the second signal processing path 502b includes an I-V conversion circuit 72b that performs current/voltage conversion, an amplifier 82b, and an A/D converter 93b. The third signal processing path 502c includes an I-V conversion circuit 72c that performs current/voltage conversion, an amplifier 82c, and an A/D converter 93c.

The A/D converters 93a to 93c operate, for example, simultaneously based on a synchronization clock CLK2. It is, however, noted that the above description is presented by way of example, and BPF(1) to BPF(3) may be driven at different timings, in which case, the A/D converters 93a to 93c operate at different timings in accordance therewith.

The A/D converters 93a to 93c output first received light data S1' to third received light data S3', respectively. The first received light data S1' to third received light data S3' are supplied to the signal processor (computation section) 650.

The signal processor (computation section) 650 performs predetermined signal processing based on the first received light data S1' to the third received light data S3' to measure, for example, a spectrophotometric distribution of associated with the sample 200 (see FIG. 1A). The signal processor 650 outputs spectrophotometric distribution information Sout. Measuring a spectrophotometric distribution allows measurement of the color of the sample 200, analysis of the components of the sample 200, and other operation. The light source 100 can be turned off not to consume unnecessary electric power until the signal processor 650 is ready for the operation described above. On the other hand, when the measurement is continuously performed on a plurality of samples, the light source 100 may be kept turned on.

In the spectrometric measurement apparatus 700 shown in FIG. 3, the three variable gap etalons BPF(1) to BPF(3), which form the optical filter, are concurrently driven, and the light receiver 400 receives the light having passed through the filters and concurrently processes the resultant received light signals. Since the acquisition of the received light signals and the processing thereof are both performed concurrently, the spectrometric measurement is efficiently performed. The period from the start to the end of the spectrometric measurement can be much shorter than that achievable in related art.

Figure 4A:
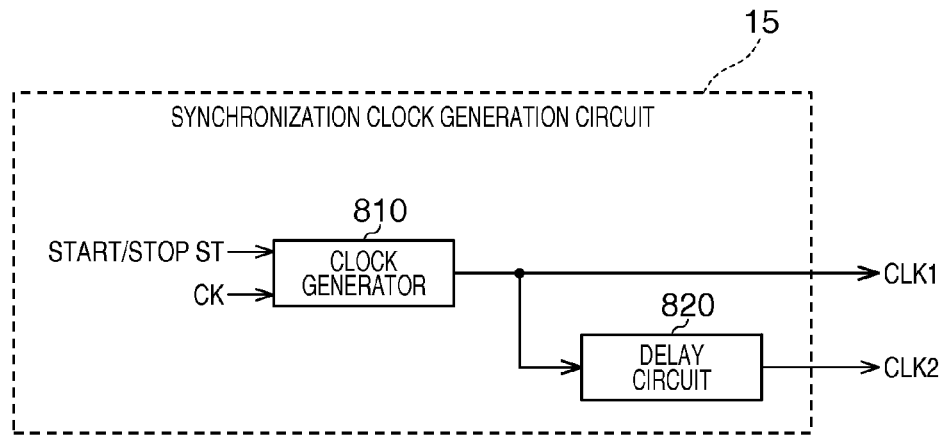
FIG. 4A shows an example of the configuration of a synchronization clock generation circuit incorporated in a controller.
Figure 4B:
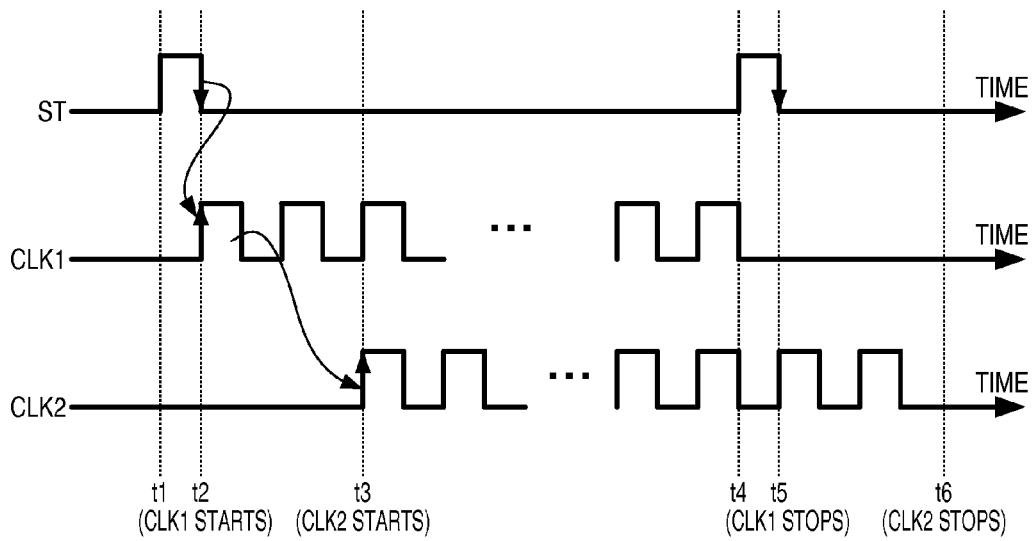
FIG. 4B shows an example of the operation of the synchronization clock generation circuit.

FIG. 4A shows an example of the configuration of the synchronization clock generation circuit incorporated in the controller, and FIG. 4B shows an example of the operation of the synchronization clock generation circuit. The synchronization clock generation circuit 15 includes a clock generator 810 and a delay circuit 820, as shown in FIG. 4A. The clock generator 810 receives a start/stop signal ST, which instructs the clock generator 810 to start/stop clock generation, and a reference clock CK (such as system clock).

The synchronization clock generation circuit 15, when it is producing no clock and receives the start/stop signal ST, starts generating the synchronization clock CLK1. On the other hand, the synchronization clock generation circuit 15, when it is producing the clock and receives the start/stop signal ST, stops generating the synchronization clock CLK1. The delay circuit 820 delays the synchronization clock CLK1 by a predetermined period. As a result, the delay circuit 820 outputs the synchronization clock CLK2.

In the example shown in FIG. 4B, the following actions are carried out: The start/stop signal ST is inputted at time t1; generation of the synchronization clock CLK1 starts at time t2; generation of the synchronization clock CLK2 starts at time t3; the start/stop signal ST is inputted at time t4; the synchronization clock CLK1 is terminated at time t5 and afterward, and the synchronization clock CLK2 is terminated at time t6 and afterward.

Figure 5:
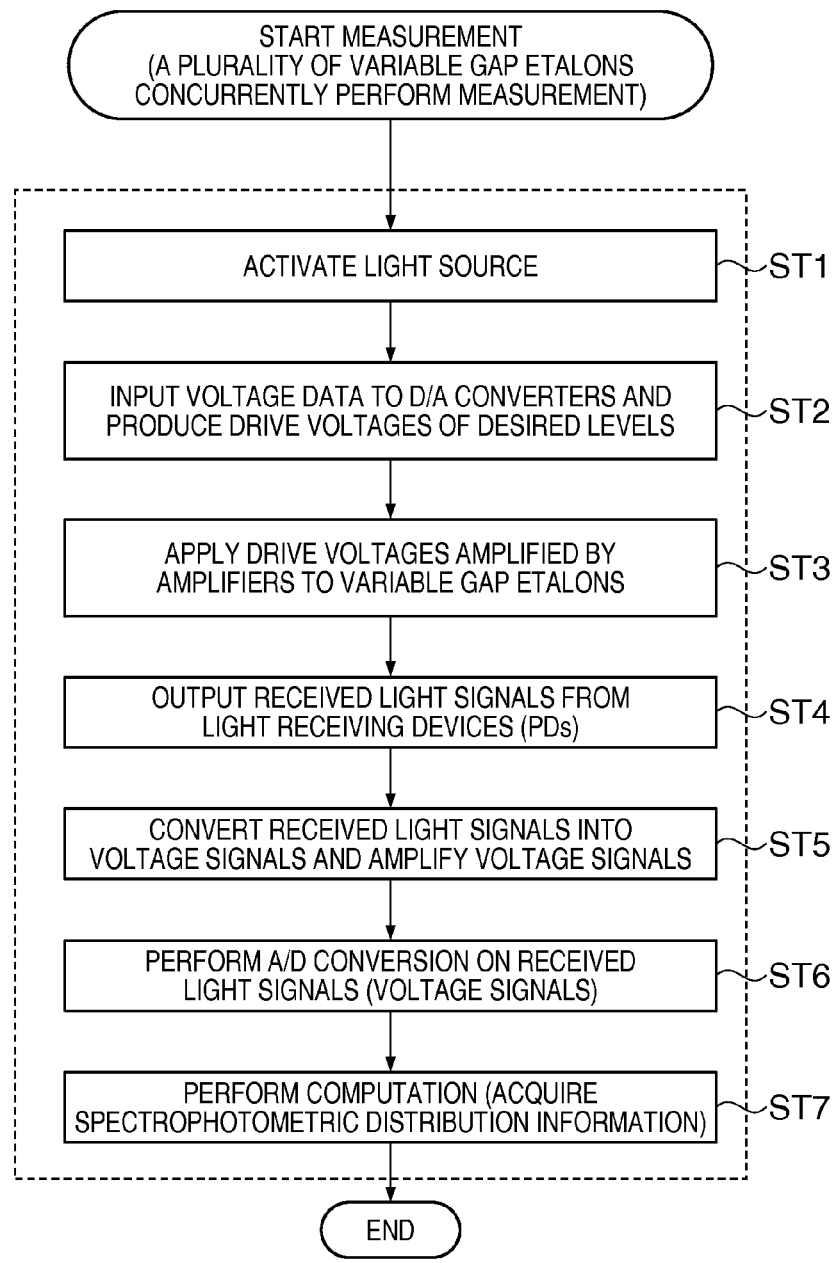
FIG. 5 is a flowchart showing an example of actions of the spectrometric measurement apparatus.

FIG. 5 is a flowchart showing an example of actions of the spectrometric measurement apparatus shown in FIG. 3. As described above, spectrometric measurement processes using the three variable gap etalons (BPF(1) to BPF(3)) are performed concurrently.

The spectrometric measurement includes, for example, steps ST1 to ST7. That is, the light source is first activated (step ST1). Voltage data corresponding to the wavelength ranges of the spectral bands are inputted to the D/A converters 33a to 33c, which then output voltages for driving the variable gap etalons BPF(1) to BPF(3) (step ST2). The amplifiers 42a to 42c then amplify the drive voltages, and the amplified drive voltages are applied to the variable gap etalons BPF(1) to BPF(3) (step ST3).

The light receiving devices PD(1) to PD(3) then output received light signals (current signals) S1 to S3 (step ST4). The I-V conversion circuits 72a to 72c convert the received light signals S1 to S3 into voltage signals, which are further amplified by the amplifiers 82a to 82c (step ST5). The A/D converters 93a to 93c then perform A/D conversion (step ST6). The signal processor 650 performs predetermined computation, and the resultant spectrophotometric distribution information is obtained (step ST7).

Figure 6A:
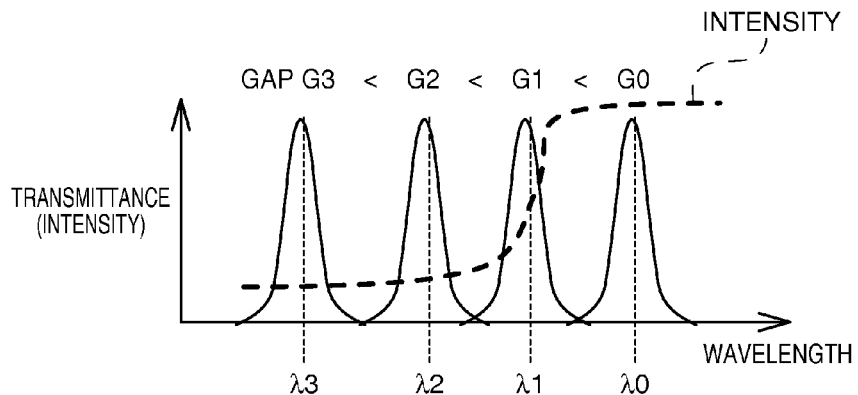
FIGS. 6A to 6C show an example of a method for measuring the object color of a sample.
Figure 6B:
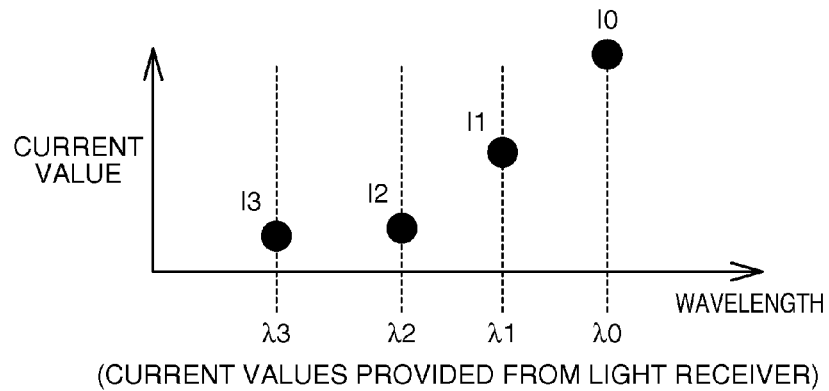
Figure 6C:
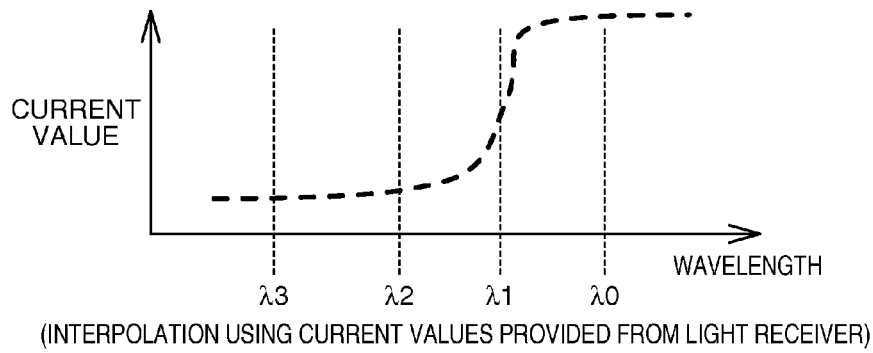

FIGS. 6A to 6C show an example of a method for measuring the object color of a sample. The number of measurement points is set at four for ease of description. The broken line shown in FIG. 6A represents the spectrophotometric distribution associated with the sample and incident on the variable gap etalons. In FIG. 6A, when the gap size is G1, the variable gap etalon has a transmission characteristic having a central wavelength equal to a wavelength $\lambda 1$. When the gap size is changed from G0 to G1 and then to G2 and finally to G3 in this order, the central wavelength of the transmission band changes from $\lambda 0$ to $\lambda 1$ and then to $\lambda 2$ and finally to $\lambda 3$ in this order.

The light receiver 400 outputs currents I3 to I0 according to the received light levels, as shown in FIG. 6B. A spectral characteristic curve (spectrophotometric distribution curve) shown in FIG. 6C can be drawn by determining the relationship between the central wavelengths $\lambda$ of the filters and the current values.

Specific Structure and Specific Action of Variable Gap Etalon

Figure 7A:
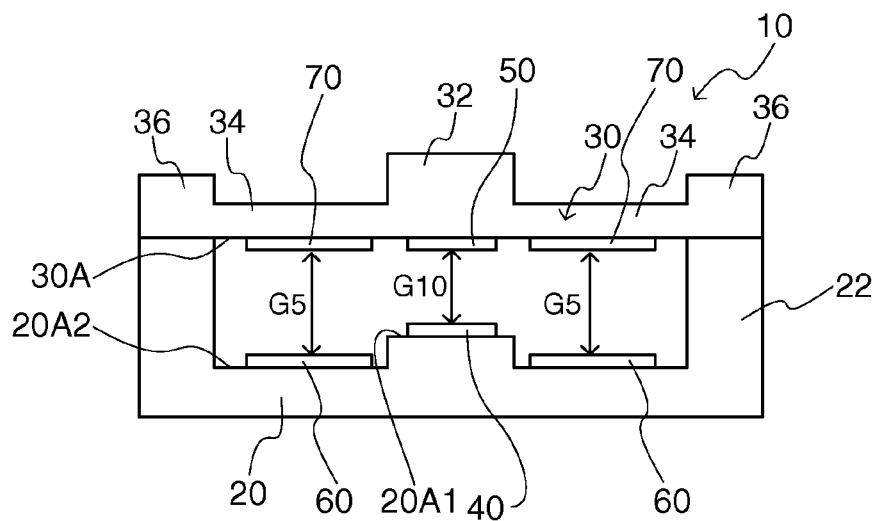
FIG. 7A shows a specific example of the structure of the variable gap etalon, and FIG. 7B describes the action thereof.

A specific example of the structure and a specific example of the action of each of the variable gap etalons will be described below. FIG. 7A shows a specific example of the structure of the variable gap etalon, and FIG. 7B describes the action thereof.

In FIG. 7A, a support 22 is so formed that it is integrated with or otherwise connected to the first substrate and movably supports the second substrate 30. Alternatively, the support 22 may be integrated with or otherwise connected to the second substrate 30 or may be formed separately from the first and second substrates 20, 30.

Each of the first and second substrates 20, 30 can be made, for example, of soda glass, crystalline glass, quartz glass, lead glass, potassium glass, borosilicate glass, no-alkali glass, or a variety of any other suitable glass materials, or crystal quartz. Among them, each of the substrates 20 and 30 is preferably made of glass containing sodium (Na), potassium (K), or other alkali metals. When each of the substrates 20 and 30 is made of the glass material described above, the optical films (reflective films) 40, 50 and the electrodes 60, 70 adhere to the substrates more intimately and the substrates themselves are bonded to each other more strongly. The two substrates 20 and 30 are integrated with each other, for example, by bonding them in a surface activated bonding process using a plasma polymerization film. Each of the first and second substrates 20, 30 has a square shape, and each side of the substrate is, for example, 10 mm long. The portion of the substrates that functions as a diaphragm has, for example, a diameter of 5 mm at maximum.

The first substrate 20 is formed by etching a glass base having a thickness of 500 μm or any other suitable value. The first optical film 40, which has a circular shape or any other suitable shape, is formed on the first substrate 20, specifically, on a first facing surface 20A1, which is a central portion of the facing surface of the first substrate 20 that faces the second substrate 30. Similarly, the second substrate 30 is formed by etching a glass base having a thickness of 200 μm or any other suitable value. The second optical film 50, which has a circular shape or any other suitable shape and faces the first optical film 40, is formed on the second substrate 30 in a central portion of a facing surface 30A that faces the first substrate 20.

Each of the first and second optical films 40, 50 has a circular shape having a diameter of approximately 3 mm or any other suitable value. Each of the first and second optical films 40, 50 can be formed, for example, of a dielectric multilayer film obtained by stacking a $TiO_2$ film and an $SiO_2$ film, each of which has a narrow full width at half maximum transmittance and excellent resolution, or may be formed of an AgC layer or a layer made of any other suitable material. The first and second optical films 40, 50 can be formed on the first and second substrates 20, 30, respectively, in a sputtering process or by using any other suitable technique. The thickness of each of the optical films is, for example, 0.03 μm. In the present embodiment, the first and second optical films 40, 50 can extract light of a desired wavelength band from the entire visible range.

Further, an anti-reflection (AR) film (not shown) can be formed on the surface that faces away from the facing surfaces 20A1 and 20A2 of the first substrate 20 in the position corresponding to the first optical film 40. Similarly, an anti-reflection (AR) film (not shown) can be formed on the surface that faces away from the facing surface 30A of the second substrate 30 in the position corresponding to the second optical film 50. Each of the anti-reflection films is formed by alternately stacking a low refractive index film and a high refractive index film. The anti-reflection films reduce the reflectance of the surfaces of the first and second substrates 20, 30 for visible light but increase the transmittance thereof for visible light.

The first and second optical films 40, 50 are so disposed that they face each other with an initial gap size G10 therebetween when no voltage is applied, as shown in FIG. 7A. In this description, the first optical film 40 is a fixed mirror and the second optical film 50 is a movable mirror, but one or both of the first and second optical films 40, 50 can be moved in accordance with the types of the first and second substrates 20, 30 described above.

The lower electrode (first electrode) 60 is formed, for example, on a second facing surface 20A2 around the first facing surface 20A1 of the first substrate 20 in a position around the first optical film 40 in a plan view. Similarly, the upper electrode (second electrode) 70 is so provided on the facing surface 30A of the second substrate 30 that the upper electrode 70 faces the lower electrode 60. The lower electrode (first electrode) 60 and the upper electrode (second electrode) 70 face each other with a gap size G5 therebetween. The surface of each of the lower electrode 60 and the upper electrode 70 can be coated with an insulating film. It is noted that the plan view means viewing either of the substrates in the thickness direction thereof.

In the present embodiment, the surface of the first substrate 20 that faces the second substrate 30 has the first facing surface 20A1, on which the first optical film 40 is formed, and the second facing surface 20A2, which is disposed around the first facing surface 20A1 in the plan view and on which the lower electrode 60 is formed. The first facing surface 20A1 and the second facing surface 20A2 may be flush with each other, but in the present embodiment, there is a step between the first facing surface 20A1 and the second facing surface 20A2 and the first facing surface 20A1 is set to be closer to the second substrate 30 than the second facing surface 20A2. The following relationship is therefore satisfied: the initial gap size G10<the gap size G5.

Figure 7B:
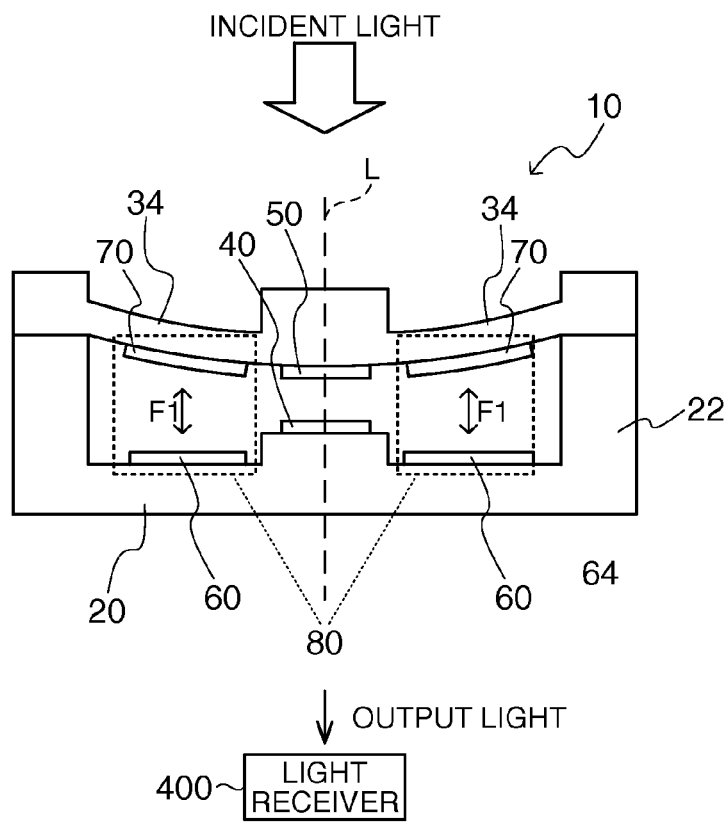

In the optical filter 300, an electrostatic force (electrostatic attraction in this description) F1 indicated by the arrows in FIG. 7B can be produced between the electrodes facing each other by applying a common voltage (ground voltage, for example) to the upper electrode 70 disposed around the second optical film 50 in the plan view and applying a voltage to the lower electrode 60 disposed around the first optical film 40 in the plan view. That is, the lower electrode 60 and the upper electrode 70 form the electrostatic actuator 80. The electrostatic attraction F1 allows variable control of the gap between the first optical film 40 and the second optical film 50 to be smaller than the initial gap size G10. The size of the gap between the optical films determines the wavelength of the transmitted light. Changing the size of the gap therefore allows selection of transmitted light of a desired wavelength.

As shown in FIG. 7B, incident light travels, for example, downward to the second substrate 30. Only the light of the wavelength band (spectral band) determined by the size of the gap of the variable gap etalon passes through the first substrate 20 and forms output light, which is received by the light receiver 400 and converted into an electric signal (received light signal) according to the intensity of the received light.

In the example shown in FIGS. 7A and 7B, to ensure the flexibility of the second substrate 30, which is the movable substrate, the area where the upper electrode (second electrode) 70 is formed is a thin-walled portion 34 having a thickness of approximately 50 μm or any other suitable value. The thin-walled portion 34 is thinner than a thick-walled portion 32 where the second optical film 50 is disposed and a thick-walled portion 36 that is in contact with the support 22. In other words, the second substrate 30 has the flat surface 30A where the second optical film 50 and the upper electrode 70 are formed, the thick-walled portion 32 formed in a first area where the second optical film 50 is disposed, and the thin-walled portion 34 formed in a second area where the upper electrode 70 is formed. Providing the thin-walled portion 34, which ensures flexibility, and the thick-walled portion 32, which is hard to flex, thus allows the second optical film 50 to keep its flatness and the size of the gap to be changed.

Figure 8A:
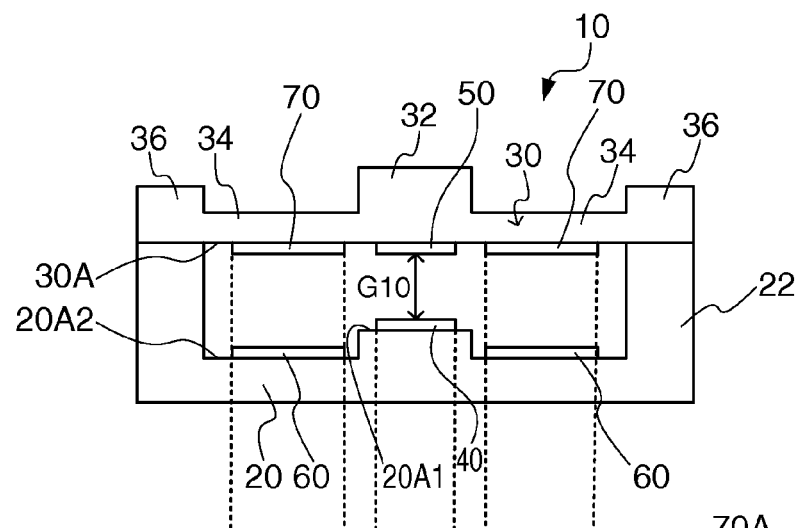
FIGS. 8A to 8C describe the layout of electrodes and optical films in the variable gap etalon filter.
Figure 8B:
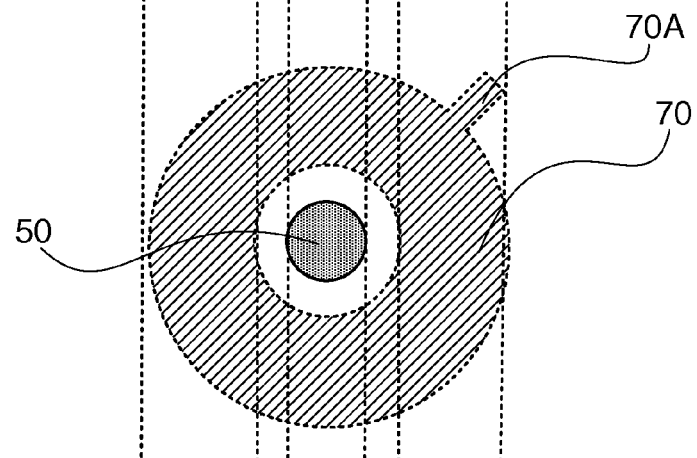
Figure 8C:
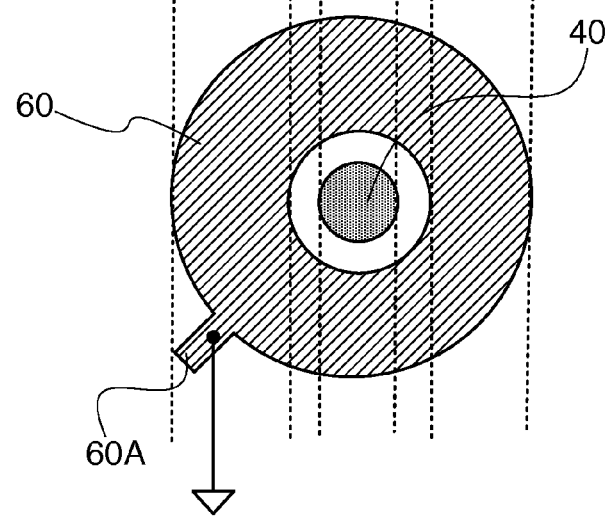

FIGS. 8A to 8C describe the layout of the electrodes and the optical films in each of the variable gap etalon filters. FIG. 8A is a cross-sectional view of the variable gap etalon filter (reference characters are the same as those in the figures described above). FIG. 8B shows the layout of the upper electrode (second electrode) 70 and the second optical film 50 in the plan view. FIG. 8C shows the layout of the lower electrode (first electrode) 60 and the first optical film 40 in the plan view.

As shown in FIGS. 8A to 8C, the first optical film 40 is provided in a central portion of the first substrate 20, and the second optical film 50 is so provided in a central portion of the second substrate 30 that the second optical film faces the first optical film 40. Further, the first electrode (first drive electrode) 60 is provided on the first substrate 20 and formed around the first optical film 40 in the plan view (specifically, so formed that the first electrode 60 surrounds the first optical film 40). The second electrode (second drive electrode) 70 is provided on the second substrate 30 and formed around the second optical film 50 in the plan view (specifically, so formed that the second electrode 70 surrounds the second optical film 50). In FIGS. 8B and 8C, reference characters 70A and 60A denote extracted electrodes.

In the optical filter 300 having the structure described above, the areas where the optical films (first optical film 40 and second optical film 50) are formed differ from the areas where the electrodes (lower electrode 60 and upper electrode 70) are formed in the plan view (see FIGS. 8B and 8C), whereby the optical films and the electrodes do not overlap with each other, unlike the example described in JP-A-11-142752. In the present embodiment, in which at least one of the first and second substrates 20, 30 (the second substrate 30 in the present embodiment) is a movable substrate, the movable substrate can be flexible because the optical films and the electrodes do not overlap with each other. Further, unlike the optical filter described in JP-A-11-142752, since no optical film is formed on the lower electrode 60 or the upper electrode 70, using the optical filter 300 as a transmissive or reflective variable wavelength interference filter does not require the lower or upper electrode 60, 70 to be transparent. Even when the lower and upper electrodes 60, 70 are made transparent, the transmission characteristic is affected in the example described in JP-A-11-142752. In contrast, in the example shown in FIGS. 8A to 8C, no optical film is formed on the lower electrode 60 or the upper electrode 70, and hence no light passes through the portions where the electrodes are formed. As a result, a desired transmission characteristic is readily provided in the optical filter 300, which is a transmissive variable wavelength interference filter.

Figure 9:
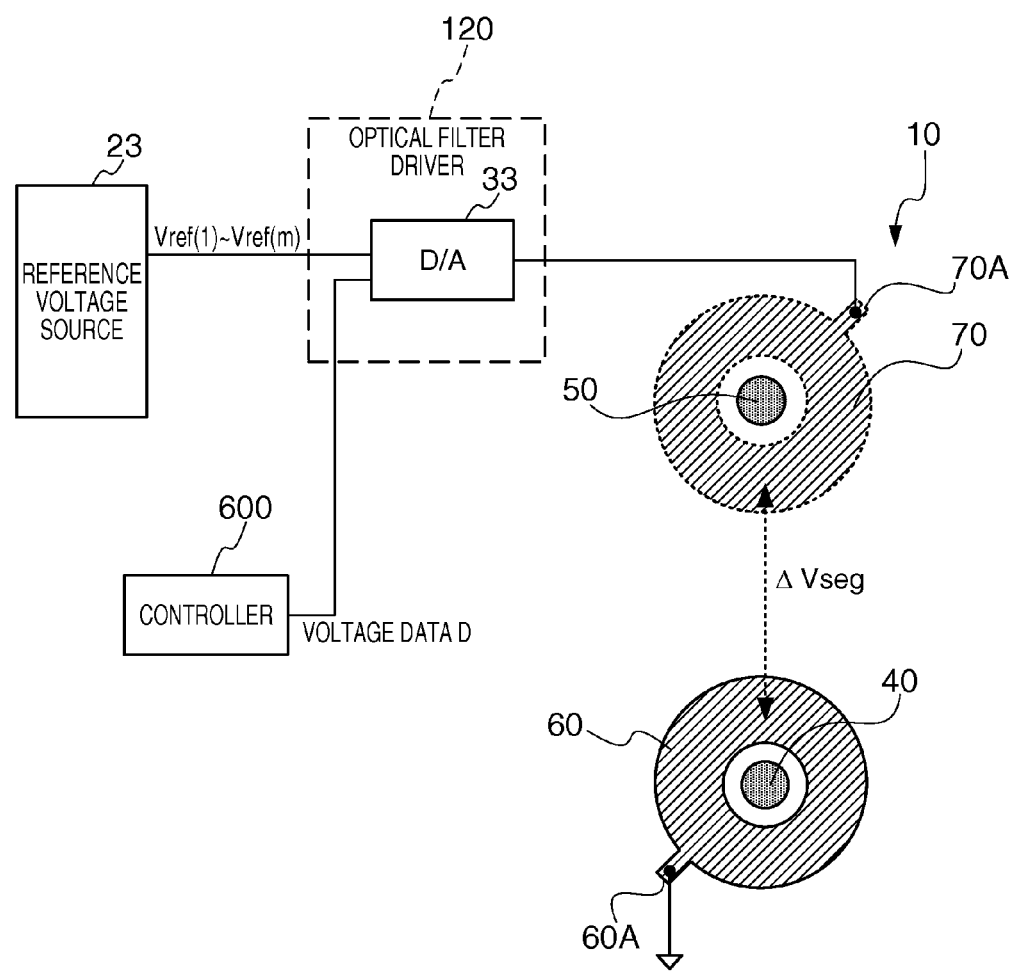
FIG. 9 describes gap control using an electrostatic actuator.

FIG. 9 describes gap control using the electrostatic actuator. The optical filter driver 120 shown in FIG. 9 includes the D/A converters 33. The D/A converters 33 output drive voltages corresponding to the voltage data D, as described above. Each of the drive voltages is applied, for example, to the corresponding upper electrode (second electrode) 70, which is part of the electrostatic actuator. On the other hand, the potential at the lower electrode (first electrode) 60 is fixed (grounded, for example). When a potential difference ΔVseg is produced between the upper electrode (second electrode) 70 and the lower electrode (first electrode) 60, electrostatic attraction according to the potential difference is induced. As a result, the second substrate 30, which is the movable substrate, is bent, and the size of the gap between the first optical film 40 and the second optical film 50 changes (that is, the gap narrows).

Second Embodiment

In a second embodiment, a specific method for driving variable gap etalon filters will be described. There are two methods for driving variable gap etalon filters: a method in which the filters have the same initial gap size and the drive voltages applied to the filters have different levels (first driving method) and a method in which the filters have different initial gap sizes and the same drive voltage is applied to the filters (second driving method). The two methods will be described below in this order.

First Driving Method

Figure 10:
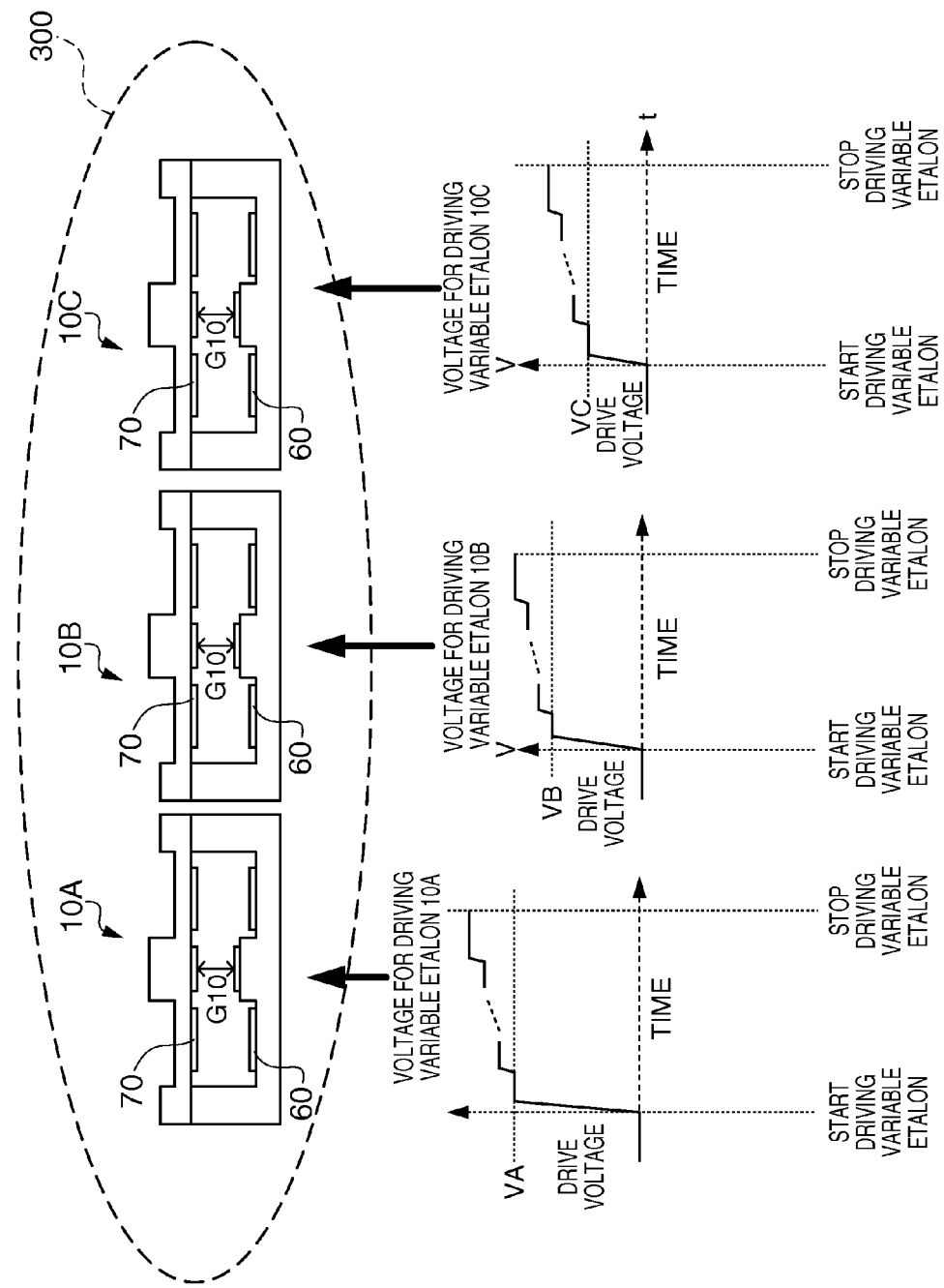
FIG. 10 describes a first method for driving variable gap etalon filters.

FIG. 10 describes the first driving method for driving variable gap etalon filters. As shown in an upper portion of FIG. 10, three variable gap etalon filters 10A, 10B, and 10C are arranged side by side.

The filters 10A, 10B, and 10C have the same initial gap size G10. The filters 10A, 10B, and 10C correspond to the variable wavelength bandpass filters BPF(1) to BPF(3) shown in FIG. 1A. Each of the filters 10A, 10B, and 10C has the structure described with reference to FIGS. 7A and 7B. The variable gap etalon filters 10A, 10B, and 10C are configured as follows: The filter 10A extracts light of a short wavelength band; the filter 10B extracts light of an intermediate wavelength band; and the filter 10C extracts light of a long wavelength band.

The filters 10A, 10B, and 10C are, for example, driven simultaneously. As shown in a lower portion of FIG. 10, when the variable gap etalon filter 10A starts being driven, the level of the drive voltage sharply increases to a first level VA, and the voltage level then increases in a stepwise manner. Similarly, when the variable gap etalon filter 10B starts being driven, the level of the drive voltage sharply increases to a second level VB, and the voltage level then increases in a stepwise manner.

When the variable gap etalon filter 10C starts being driven, the level of the drive voltage sharply increases to a third level VC, and the voltage level then increases in a stepwise manner. The gap in the filters 10A, 10B, and 10C are controlled individually in response to the changes in the voltage levels, and the gap sizes in the filters 10A, 10B, and 10C become different from one another. As a result, spectral bands having desired wavelength ranges are provided in the filters 10A, 10B, and 10C.

When the first driving method is employed, drive voltages having different levels can be applied to the filters 10A, 10B, and 10C. In this case, even if the characteristics of the filters vary, the drive voltages can be so (finely) adjusted that the variances are compensated. Since optimum drive voltages are applied to the filters 10A, 10B, and 10C, the spectral bands of the filters 10A, 10B, and 10C are provided more precisely.

Further, since different drive voltages are applied to the filters 10A, 10B, and 10C, overshooting (and undershooting) phenomena that occur when the voltages are applied have different cycles. If such fluctuations in the drive voltages are superimposed, the resultant large noise may greatly change the reference potential (ground GND or power source potential VDD) in the optical filter driver 120. However, when the first driving method, in which the fluctuations in the drive voltages have different cycles, is employed, the noise is distributed along the temporal axis and hence large noise is unlikely produced. Further, since the drive voltage can be adjusted for each of the filters, for example, fine adjustment of the drive voltage is readily made by changing the drive voltage by a small amount at a time when the voltage level is switched. In this case, the overshooting of the drive voltage that occurs when the voltage is switched can be suppressed.

Second Driving Method

Figure 11:
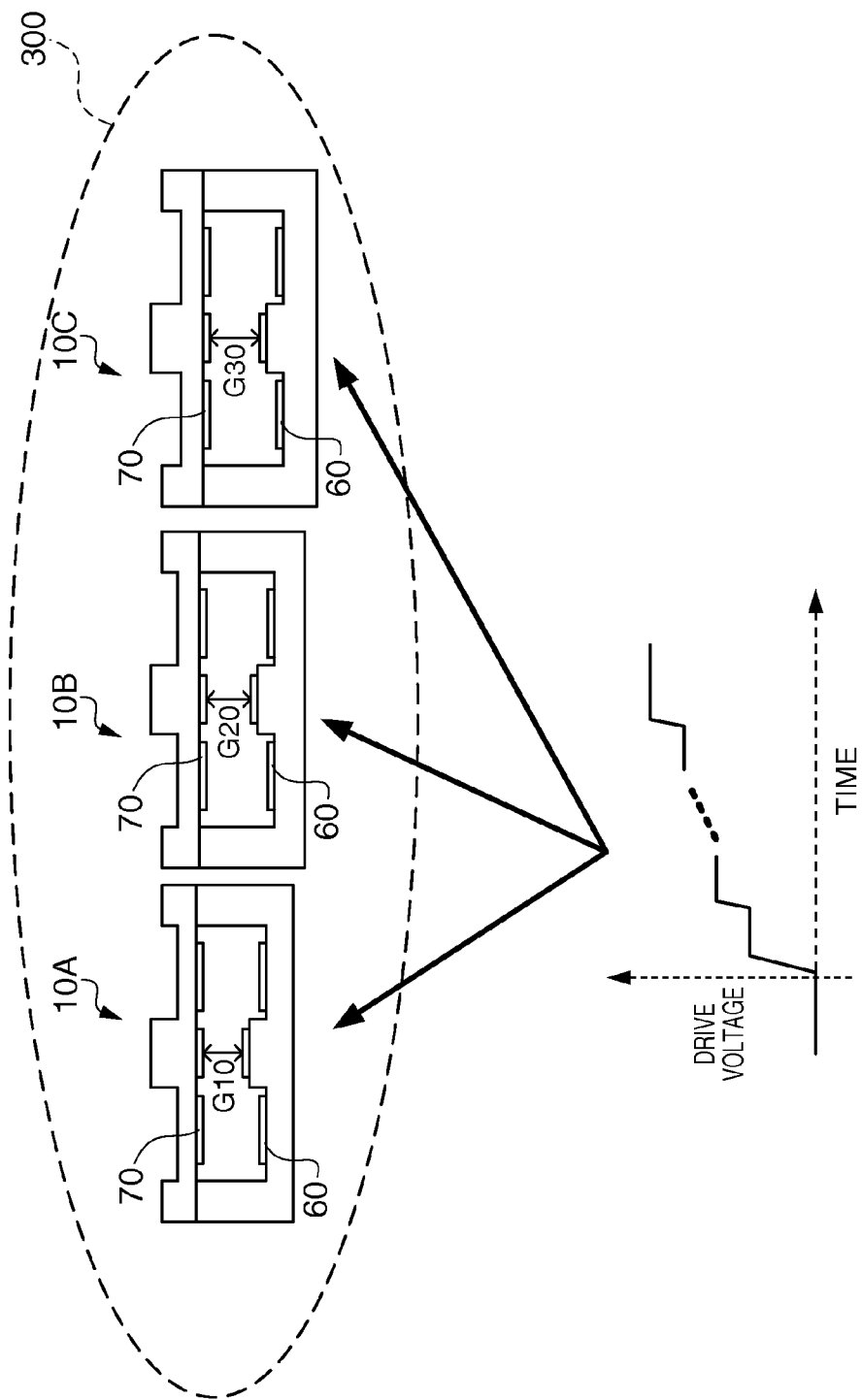
FIG. 11 describes a second method for driving variable gap etalon filters.

FIG. 11 describes the second driving method for driving variable gap etalon filters. As shown in an upper portion of FIG. 11, three variable gap etalon filters 10A, 10B, and 10C are arranged side by side. The filters 10A, 10B, and 10C correspond to the variable wavelength bandpass filters BPF(1) to BPF(3) shown in FIG. 1A. The initial gap sizes of the filters are set as follows: The initial gap size of the filter 10A is set at G10; the initial gap size of the filter 10B is set at G20; and the initial gap size of the filter 10C is set at G30.

Each of the filters 10A, 10B, and 10C has the structure described with reference to FIGS. 7A and 7B. The variable gap etalon filters 10A, 10B, and 10C are configured as follows: The filter 10A extracts light of a short wavelength band; the filter 10B extracts light of an intermediate wavelength band; and the filter 10C extracts light of a long wavelength band, as in the example shown in FIG. 10.

The filters 10A, 10B, and 10C have different initial gap sizes, as described above. That is, as the initial gap size in each of the filters 10A, 10B, and 10C, the gap size corresponding to the wavelength at one end of the spectral band extracted by the filter is selected. The filters 10A, 10B, and 10C are, for example, driven simultaneously. As shown in a lower portion of FIG. 11, when the variable gap etalon filters 10A, 10B, and 10C start being driven, a common drive voltage is supplied to the filters 10A, 10B, and 10C. The level of the drive voltage increases in a stepwise manner whenever a predetermined period has elapsed.

According to the second driving method, the same drive voltage can be applied to the filters 10A, 10B, and 10C, which allows reduction in the number of drive voltage values set in the voltage data table 19 (see FIG. 3) in the voltage setting memory 17 provided in the controller 600. When n variable gap etalon filters are used, the number of voltages to be set is reduced to 1/n. As a result, the voltage setting memory 17 can be a small capacity memory, which reduces the footprint of the voltage setting memory 17, which is advantageous in size reduction. Further, the voltage setting memory 17 can, for example, be an inexpensive ROM.

The noise that occurs when the drive voltages are switched will not be so problematic as long as the amounts of change in the drive voltages are not very large whenever they are switched. Further, when the device structure described with reference to FIGS. 7A and 7B is employed as the structure of each of the variable gap etalons, the gap can be controlled accurately and stably, whereby the variance in characteristic of the filters 10A, 10B, and 10C can be minimized. The gaps in the filters 10A, 10B, and 10C are therefore controlled precisely even when the same drive voltage is applied to the filters.

FIGS. 12A and 12B show examples of specific drive voltage values versus wavelengths at which the measurement is performed. FIG. 12A shows a case where the first driving method described above is employed, and FIG. 12B shows a case where the second driving method described above is employed.

In the examples shown in FIGS. 12A and 12B, measurement points are provided as follows: Measurement points p1 to p5 are provided in a range from 400 to 480 nm (short wavelength band) where the measurement is performed (central wavelengths of spectral bands); measurement points p6 to p10 are provided in a range from 500 to 580 nm (intermediate wavelength band) where the measurement is performed (central wavelengths of spectral bands); and measurement points p11 to p16 are provided in a range from 600 to 700 nm (long wavelength band) where the measurement is performed (central wavelengths of spectral bands).

The drive voltage of 41 V shown in FIG. 12A corresponds to the first voltage level VA in the example shown in FIG. 10. The drive voltage of 36 V shown in FIG. 12A corresponds to the second voltage level VB in the example shown in FIG. 10. The drive voltage of 24 V shown in FIG. 12A corresponds to the third voltage level VC in the example shown in FIG. 10.

In the example shown in FIG. 12A, the measurement is performed as follows: The measurement at the measurement point p16 is first performed; the measurement at the measurement points p5, p10, and p15 is then performed concurrently; the measurement at the measurement points p4, p9, and p14 is then performed concurrently; the measurement at the measurement points p3, p8, and p13 is then performed concurrently; the measurement at the measurement points p2, p7, and p12 is then performed concurrently; and the measurement at the measurement points p1, p6, and p11 is then performed concurrently.

In the example shown in FIG. 12B, there are six possible drive voltage values: 24 V, 29 V, 33 V, 37 V, 41 V, and 45 V. Among them, the drive voltages of 29 V, 33 V, 37 V, 41 V, and 45 V are common to the filters 10A, 10B, and 10C. The drive voltage of 24 V corresponds to the measurement point p16 in the filter 10C.

As in the example shown in FIG. 12A, the measurement is performed in the example shown in FIG. 12B as follows: The measurement at the measurement point p16 is first performed; the measurement at the measurement points p5, p10, and p15 is then performed concurrently; the measurement at the measurement points p4, p9, and p14 is then performed concurrently; the measurement at the measurement points p3, p8, and p13 is then performed concurrently; the measurement at the measurement points p2, p7, and p12 is then performed concurrently; and the measurement at the measurement points p1, p6, and p11 is then performed concurrently.

Third Embodiment

FIG. 13 is a block diagram showing a schematic configuration of a transmitter in a wavelength multiplexing communication system, which is another example of the optical apparatus according to an embodiment of the invention. Wavelength division multiplexing (WDM) communication is based on the fact that signals having different wavelengths do not interfere with each other. When a plurality of optical signals having different wavelengths are multiplexed in a single optical fiber, the amount of transmitted data can be increased without any increase in the number of optical fiber communication lines.

In FIG. 13, a wavelength multiplexing transmitter 800 includes an optical filter 300 on which light from a light source 100 is incident, and a plurality of light fluxes of wavelengths $\lambda 0$, $\lambda 1$, $\lambda 2$, and so on are outputted from the optical filter 300. Transmission devices 311, 312, and 313 are provided for the respective wavelengths. Optical pulse signals corresponding to a plurality of channels from the transmission devices 311, 312, and 313 are combined in a wavelength multiplexer 321, and the combined signal is sent to a single optical fiber channel 331.

The invention is also applicable to an optical code division multiplexing (OCDM) transmitter because in OCDM, which is so designed that a channel is identified by pattern matching among coded optical pulse signals, optical pulses that form an optical pulse signal contain optical components of different wavelengths.

As described above, according to at least one of the embodiments of the invention, for example, the period required for variable wavelength filters to scan an entire desired wavelength band discretely on a predetermined bandwidth basis can be shortened. When an optical filter including the variable wavelength filters is used in a spectrometric measurement apparatus, the period from the start to the end of spectrometric measurement can be shortened. Further, using a plurality of variable wavelength bandpass filters and allocating spectral wavelength bands to the filters allows a burden on each of the filters to be reduced. As a result, for example, the moving range of a movable portion of each of the variable wavelength filters can be reduced, and increase in the voltage for driving the filter can be suppressed. Moreover, for example, since a burden related to manufacturing the filters is reduced, optical films used in the filters can be made of the same material.

The invention is preferably applicable to an optical filter, an optical filter module, a spectrometric measurement apparatus (such as colorimetric sensor and gas sensor), and an optical apparatus (including optical communication apparatus).

Several embodiments according to the invention have been described above. Those skilled in the art can readily understand that many changes can be made to the embodiments without substantially departing from the novel features and advantageous effects of the invention. It is therefore intended that the invention encompasses all such changes. For example, a term set forth in the specification or the drawings at least once along with a different term but having a meaning in a broader sense or having the same meaning can be replaced with the different term in any location in the specification or the drawings.

The entire disclosure of Japanese Patent Application No. 2010-158876, filed Jul. 13, 2010 is expressly incorporated by reference herein.

What is claimed is:

1. An optical filter comprising:
a first variable wavelength bandpass filter;
a second variable wavelength bandpass filter;
a driver that drives each of the first and second variable wavelength bandpass filters; and
a controller that variably controls a spectral band of each of the first and second variable wavelength bandpass filters,
wherein the first variable wavelength bandpass filter extracts light of a first wavelength band located in a desired wavelength band and has at least the following spectral bands: a first spectral band having a central wavelength equal to a first wavelength in the first wavelength band and a second spectral band having a central wavelength equal to a second wavelength in the first wavelength band,
the second variable wavelength bandpass filter extracts light of a second wavelength band located in the desired wavelength band and adjacent to the first wavelength band and has at least the following spectral bands: a third spectral band having a central wavelength equal to a third wavelength in the second wavelength band and a fourth spectral band having a central wavelength equal to a fourth wavelength in the second wavelength band,
the driver drives the first and second variable wavelength bandpass filters concurrently,
the period during which the first variable wavelength bandpass filter extracts the light of the first spectral band overlaps with at least part of the period during which the second variable wavelength bandpass filter extracts the light of the third spectral band, and
the period during which the first variable wavelength bandpass filter extracts the light of the second spectral band overlaps with at least part of the period during which the second variable wavelength bandpass filter extracts the light of the fourth spectral band.

2. The optical filter according to claim 1,
wherein each of the first and second variable wavelength bandpass filters is formed of a variable gap etalon filter,
the first variable wavelength bandpass filter has a first gap and the second variable wavelength bandpass filter has a second gap,
the first and second gaps have the same initial gap size when the first and second variable wavelength bandpass filters start being driven, and
the driver drives the first variable wavelength bandpass filter with a first drive voltage and drives the second variable wavelength bandpass filter with a second drive voltage different from the first drive voltage.

3. The optical filter according to claim 2,
wherein the first variable wavelength bandpass filter includes
a first substrate,
a second substrate that faces the first substrate,
a first optical film provided on the first substrate,
a second optical film provided on the second substrate and facing the first optical film,
a first electrode provided on the first substrate and formed around the first optical film in a plan view viewed in a thickness direction of the first substrate, and
a second electrode provided on the second substrate and formed around the second optical film in a plan view viewed in a thickness direction of the second substrate,
the first variable wavelength bandpass filter can extract light of the first or second spectral band when the first gap between the first optical film and the second optical film is changed by an electrostatic force induced between the first electrode and the second electrode,
the second variable wavelength bandpass filter includes
a third substrate,
a fourth substrate that faces the third substrate,
a third optical film provided on the third substrate,
a fourth optical film provided on the fourth substrate and facing the third optical film,
a third electrode provided on the third substrate and formed around the third optical film in a plan view viewed in a thickness direction of the third substrate, and
a fourth electrode provided on the fourth substrate and formed around the fourth optical film in a plan view viewed in a thickness direction of the fourth substrate, and
the second variable wavelength bandpass filter can extract light of the third or fourth spectral band when the second gap between the third optical film and the fourth optical film is changed by an electrostatic force induced between the third electrode and the fourth electrode.

4. The optical filter according to claim 3,
wherein the first, second, third, and fourth optical films are made of the same material.

5. An optical filter module comprising:
the optical filter according to claim 3; and
a light receiver that receives light having passed through the optical filter.

6. A spectrometric measurement apparatus comprising:
the optical filter according to claim 3;
a light receiver that receives light having passed through the optical filter; and
a signal processor that performs predetermined signal processing based on received light signals provided from the light receiver,
the controller drives the first and second variable wavelength bandpass filters, and
the signal processing of a first received light signal provided from the light receiver that receives the light having passed through the first variable wavelength bandpass filter and the signal processing of a second received light signal provided from the light receiver that receives the light having passed through the second variable wavelength bandpass filter are performed concurrently.

7. An optical filter module comprising:
the optical filter according to claim 2; and
a light receiver that receives light having passed through the optical filter.

8. A spectrometric measurement apparatus comprising:
the optical filter according to claim 2;
a light receiver that receives light having passed through the optical filter; and
a signal processor that performs predetermined signal processing based on received light signals provided from the light receiver,
the controller drives the first and second variable wavelength bandpass filters, and
the signal processing of a first received light signal provided from the light receiver that receives the light having passed through the first variable wavelength bandpass filter and the signal processing of a second received light signal provided from the light receiver that receives the light having passed through the second variable wavelength bandpass filter are performed concurrently.

9. The optical filter according to claim 1,
wherein each of the first and second variable wavelength bandpass filters is formed of a variable gap etalon filter,
the first variable wavelength bandpass filter has a first gap and the second variable wavelength bandpass filter has a second gap,
the first and second gaps have different initial gap sizes when the first and second variable wavelength bandpass filters start being driven, and
the driver drives the first variable wavelength filter with a first drive voltage and drives the second variable wavelength filter with a second drive voltage equal to the first drive voltage.

10. An optical filter module comprising:
the optical filter according to claim 9; and
a light receiver that receives light having passed through the optical filter.

11. A spectrometric measurement apparatus comprising:
the optical filter according to claim 9;
a light receiver that receives light having passed through the optical filter; and
a signal processor that performs predetermined signal processing based on received light signals provided from the light receiver,
the controller drives the first and second variable wavelength bandpass filters, and
the signal processing of a first received light signal provided from the light receiver that receives the light having passed through the first variable wavelength bandpass filter and the signal processing of a second received light signal provided from the light receiver that receives the light having passed through the second variable wavelength bandpass filter are performed concurrently.

12. An optical filter module comprising:
the optical filter according to claim 1; and
a light receiver that receives light having passed through the optical filter.

13. A spectrometric measurement apparatus comprising:
the optical filter according to claim 1;
a light receiver that receives light having passed through the optical filter; and
a signal processor that performs predetermined signal processing based on received light signals provided from the light receiver,
the controller drives the first and second variable wavelength bandpass filters, and
the signal processing of a first received light signal provided from the light receiver that receives the light having passed through the first variable wavelength bandpass filter and the signal processing of a second received light signal provided from the light receiver that receives the light having passed through the second variable wavelength bandpass filter are performed concurrently.

* * * * *